(12) United States Patent
Takakura

(10) Patent No.: US 10,514,856 B2
(45) Date of Patent: Dec. 24, 2019

(54) STORAGE SYSTEM AND STORAGE CONTROL APPARATUS

(71) Applicant: FUJITSU LIMITED, Kawasaki-shi, Kanagawa (JP)

(72) Inventor: Atsushi Takakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/173,136

(22) Filed: Oct. 29, 2018

(65) Prior Publication Data

US 2019/0155532 A1 May 23, 2019

(30) Foreign Application Priority Data

Nov. 21, 2017 (JP) .................................. 2017-223621

(51) Int. Cl.
*G06F 3/06* (2006.01)
*G06F 11/30* (2006.01)

(52) U.S. Cl.
CPC ............ *G06F 3/0635* (2013.01); *G06F 3/061* (2013.01); *G06F 3/067* (2013.01); *G06F 3/0653* (2013.01); *G06F 3/0659* (2013.01); *G06F 11/3034* (2013.01)

(58) Field of Classification Search
CPC ...... G06F 3/0635; G06F 3/0653; G06F 3/067; G06F 11/3034
See application file for complete search history.

(56) References Cited

U.S. PATENT DOCUMENTS

| 9,385,967 | B1* | 7/2016 | Hathorn | ............... H04L 47/826 |
| 2009/0265584 | A1 | 10/2009 | Kawakami et al. | |
| 2009/0307341 | A1* | 12/2009 | Minato | ................ G06F 3/0605 709/223 |
| 2010/0235571 | A1 | 9/2010 | Ishii et al. | |
| 2012/0036330 | A1* | 2/2012 | Saito | ..................... G06F 3/0617 711/162 |
| 2014/0006725 | A1 | 1/2014 | Shiomi | |
| 2017/0357589 | A1* | 12/2017 | Izawa | ...................... G06F 3/06 |

FOREIGN PATENT DOCUMENTS

| JP | 2007-280258 | 10/2007 |
| JP | 2010-211428 | 9/2010 |
| JP | 2014-10476 | 1/2014 |

* cited by examiner

*Primary Examiner* — Glenn A. Auve
(74) *Attorney, Agent, or Firm* — Fujitsu Patent Center

(57) ABSTRACT

A first storage apparatus has first and second storage control apparatuses. The first storage control apparatus includes a first port used to transmit a command for a data input/output. The second storage control apparatus has a second port used to transmit the command. The second storage apparatus has a plurality of third ports that form a plurality of communication paths with the first and second ports. The second storage apparatus executes inputs and outputs of data based on commands received from the first storage control apparatus. Based on the processing state of the inputs and outputs via a first communication path currently being used to transmit commands to the second storage apparatus, the first storage control apparatus switches the port to be used to transmit a next command to the second storage apparatus to a port belonging to a second communication path.

9 Claims, 19 Drawing Sheets

FIG. 8

EXAMPLE ACQUISITION OF RECOMMENDED PATH INFORMATION
FOR EXTERNAL LOGICAL UNIT LU#0

| | |
|---|---|
| Port0-PortA REPORT TARGET PORT GROUPS RESPONSE | RECOMMENDED |
| Port1-PortC REPORT TARGET PORT GROUPS RESPONSE | NOT-RECOMMENDED |
| Port2-PortB REPORT TARGET PORT GROUPS RESPONSE | RECOMMENDED |
| Port3-PortD REPORT TARGET PORT GROUPS RESPONSE | NOT-RECOMMENDED |

FIG. 9

EXAMPLE SETTING OF ACCESS PATH FOR
EXTERNAL LOGICAL UNIT LU#0

| PRIORITY | PATH NAME | PORT |
| --- | --- | --- |
| 1 | THIS APPARATUS (STRAIGHT)-EXTERNAL STORAGE (STRAIGHT) | Port0-PortA |
| 2 | THIS APPARATUS (STRAIGHT)-EXTERNAL STORAGE (CROSS) | Port1-PortC |
| 3 | THIS APPARATUS (CROSS)-EXTERNAL STORAGE (STRAIGHT) | Port2-PortB |
| 4 | THIS APPARATUS (CROSS)-EXTERNAL STORAGE (CROSS) | Port3-PortD |

FIG. 10

EXTERNAL LOGICAL UNIT PATH INFORMATION

─151

| EXTERNAL LOGICAL UNIT LU#0 |
|---|
| THIS APPARATUS (STRAIGHT)-EXTERNAL STORAGE (STRAIGHT) PATH INFORMATION |
| THIS APPARATUS (STRAIGHT)-EXTERNAL STORAGE (CROSS) PATH INFORMATION |
| THIS APPARATUS (CROSS)-EXTERNAL STORAGE (STRAIGHT) PATH INFORMATION |
| THIS APPARATUS (CROSS)-EXTERNAL STORAGE (CROSS) PATH INFORMATION |
| ABNORMAL PATH INFORMATION |

FIG. 11

I/O MANAGEMENT TABLE  ─ 152

| INTER-CONTROLLER MODULE COMMUNICATION EXECUTION COUNT |
|---|
| Port0-I/O EXECUTION COUNT |
| Port1-I/O EXECUTION COUNT |
| ... |
| PortN-I/O EXECUTION COUNT |

FIG. 12

EXAMPLE OF PATH SELECTION LOGIC

| ITEM NUMBER | PRIORITY PATH | PATH STATUS | I/O EXECUTION COUNT | INTER-CONTROLLER MODULE COMMUNICATION EXECUTION COUNT | USED PATH | PROCESSING CONTENT |
|---|---|---|---|---|---|---|
| (A) PRIORITY PATH = Path#1 | | | | | | |
| 1 | Path#1 | NORMAL | BELOW UPPER LIMIT | — | Path#1 | — |
| 2 | Path#1 | NORMAL | EQUAL TO OR ABOVE UPPER LIMIT | — | — | CHANGE PRIORITY PATH TO Path#2 |
| 3 | Path#1 | ABNORMAL | — | — | — | CHANGE PRIORITY PATH TO Path#2 |
| (B) PRIORITY PATH = Path#2 | | | | | | |
| 4 | Path#2 | NORMAL | BELOW UPPER LIMIT | — | Path#2 | — |
| 5 | Path#2 | NORMAL | EQUAL TO OR ABOVE UPPER LIMIT | — | — | QUEUE IN I/O ISSUING QUEUE |
| 6 | Path#2 | ABNORMAL | — | BELOW UPPER LIMIT | — | CHANGE PRIORITY PATH TO Path#3 |
| 7 | Path#2 | ABNORMAL | — | EQUAL TO OR ABOVE UPPER LIMIT | — | QUEUE IN INTER-CONTROLLER MODULE COMMUNICATION QUEUE |
| (C) PRIORITY PATH = Path#3 | | | | | | |
| 8 | Path#3 | NORMAL | — | — | Path#3 | — |
| 9 | Path#3 | ABNORMAL | — | — | — | CHANGE PRIORITY PATH TO Path#4 |
| (D) PRIORITY PATH = Path#4 | | | | | | |
| 10 | Path#4 | NORMAL | — | — | Path#4 | — |
| 11 | Path#4 | ABNORMAL | — | — | — | I/O ABNORMAL TERMINATION |

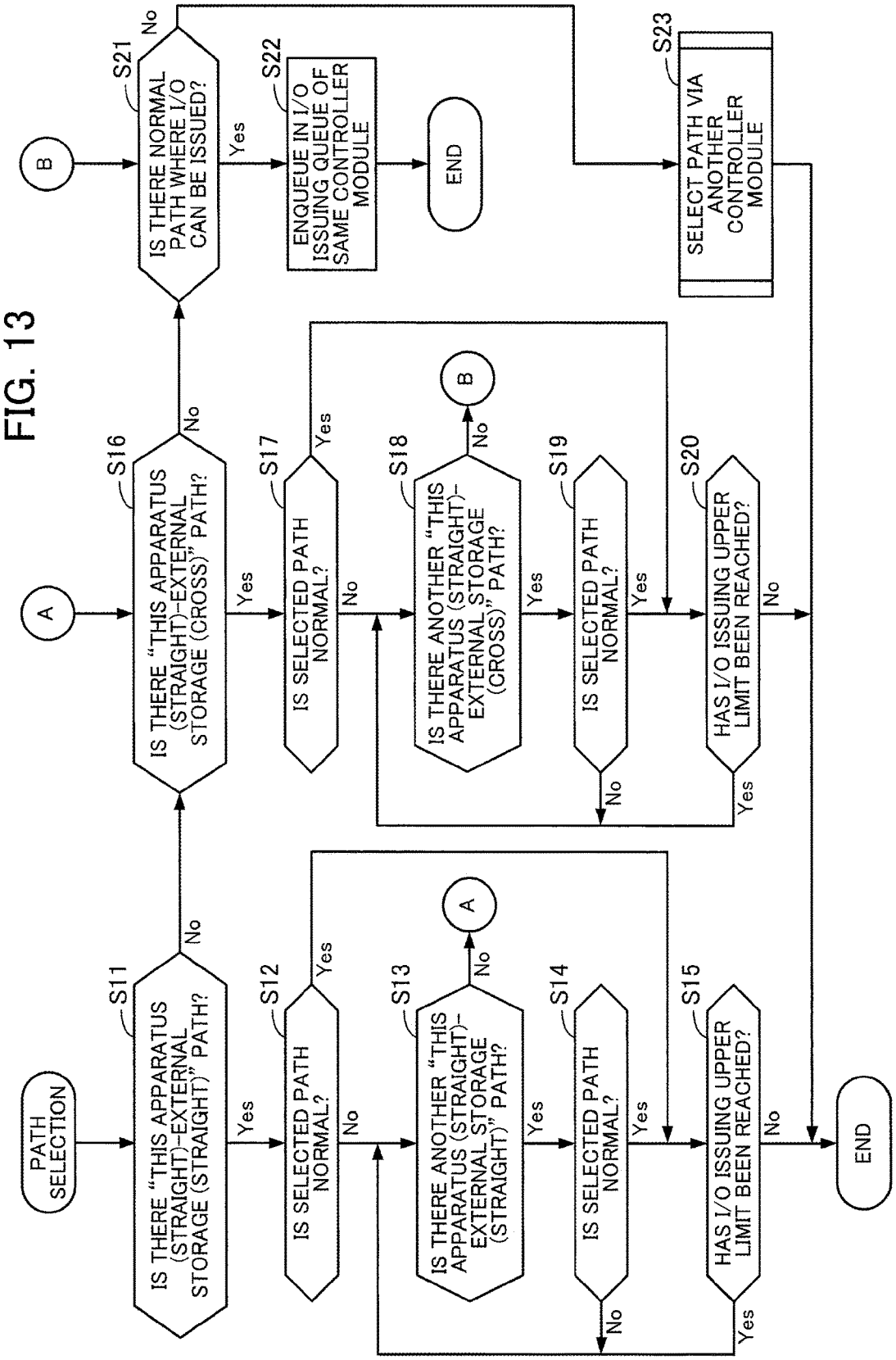

STORAGE SYSTEM AND STORAGE CONTROL APPARATUS

CROSS-REFERENCE TO RELATED APPLICATION

This application is based upon and claims the benefit of priority of the prior Japanese Patent Application No. 2017-223621, filed on Nov. 21, 2017, the entire contents of which are incorporated herein by reference.

FIELD

The embodiments discussed herein are related to a storage system and a storage control apparatus.

BACKGROUND

Storage apparatuses are used to store data. A storage apparatus is capable of housing a plurality of storage devices, such as Hard Disk Drives (HDDs) and Solid State Drives (SDDs), and provides a large-capacity storage region. A storage apparatus incorporates a storage control apparatus that performs access control for data writes and reads into and from the individual storage devices.

As one example, a storage apparatus that includes disk controllers, which issue commands to disks connected in loops, and a relay apparatus, which relays the issued commands to the disks, has been proposed. In the proposed storage apparatus, the relay apparatus monitors the number of commands issued to the loops, and by controlling the numbers of commands issued by the disk controllers based on the monitoring result, the numbers of commands processed by the relay apparatus are balanced between the disk controllers.

A storage control apparatus with two control units has also been proposed. In the proposed storage control apparatus, a controller that has received an Input/Output (I/O) request from a host uses a path between the controllers to issue an I/O request to an initiator of the other control unit. The initiator that has received the I/O request then accesses the target storage device via a connection path based on the I/O request. By doing so, even when an access from a control unit to a storage device is switched to an alternative path, it is possible to continue the I/O access to a storage device without interrupting the I/O request from the host.

Note that a storage virtualization apparatus that manages the total number of uncompleted commands at each storage port by exchanging information with another storage virtualization apparatus has also been proposed. When the total number of uncompleted commands relating to a storage port to be accessed is within a set number, the proposed storage virtualization apparatus performs an access request responding process which includes issuing a command to the storage port to be accessed without completion being delayed. Conversely, when the total number of uncompleted commands exceeds the set number, the storage virtualization apparatus executes the access request responding process so as to delay completion. By doing so, a "Queue Full" state is prevented from occurring at the storage port.

See, for example: Japanese Laid-open Patent Publication No. 2010-211428; Japanese Laid-open Patent Publication No. 2007-280258; and Japanese Laid-open Patent Publication No. 2014-10476.

It would be conceivable to connect a storage apparatus to another storage apparatus (referred to hereinafter as the "external storage apparatus") directly or via a relay apparatus. With this configuration, the storage apparatus receives an access request for the external storage apparatus from the host apparatus, performs access to the external storage apparatus in response to the access request, and sends the access result in reply to the host apparatus. By doing so, it is possible to expand the storage region provided to the host apparatus.

With this configuration, it would also be conceivable to provide a plurality of communication paths from the storage apparatus to the external storage apparatus and switch between the communication paths so as to distribute accesses between the plurality of communication paths and speed up data access. However, the storage apparatus is not capable of monitoring the operation states of physical elements provided at the external storage apparatus (such as storage control apparatuses, ports for communicating with the storage apparatus, and the storage devices themselves). This means that it is difficult for the storage apparatus to observe changes in operation states at the external storage apparatus and determine the timing for switching between the communication paths. This presents the issue of how to determine the timing for switching the communication paths at the storage apparatus.

SUMMARY

According to one aspect, there is provided a storage system including: a first storage apparatus including a first storage control apparatus, which has a first port used to transmit a command instructing an input or output of data and transmits the command in response to an access request received from an information processing device, and a second storage control apparatus, which has a second port used to transmit the command; and a second storage apparatus that includes a plurality of third ports that form a plurality of communication paths with the first port and the second port, receives the command via one of the third ports, and executes the input or output of data based on the command, wherein based on a processing state of inputs and outputs via a first communication path currently being used to transmit the command to the second storage apparatus, the first storage control apparatus switches a port to be used to transmit a next command to the second storage apparatus to a port belonging to a second communication path out of the plurality of communication paths.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 depicts an example of recommended path information acquired for external logical unit LU#0;

FIG. 9 depicts example settings of access paths for external logical unit LU#0;

FIG. 10 depicts an example of external logical unit path information;

FIG. 11 depicts an example of an I/O management table;

FIG. 12 depicts an example of path selection logic;

FIG. 13 is a flowchart depicting an example of path selection;

DESCRIPTION OF EMBODIMENTS

Figure 1:
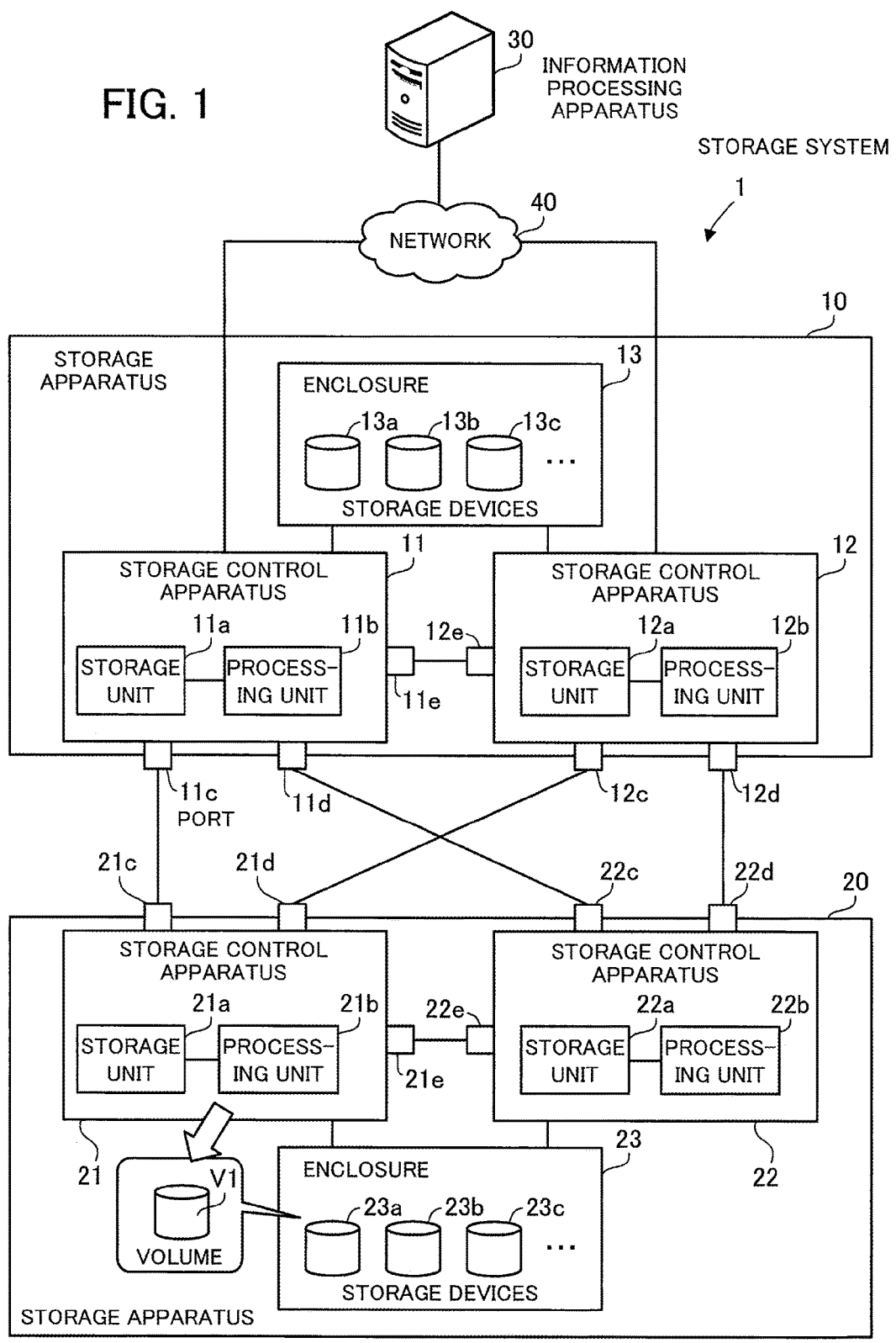
FIG. 1 depicts a storage system according to a first embodiment.

Several embodiments will be described below with reference to the accompanying drawings, wherein like reference numerals refer to like elements throughout.

First Embodiment

FIG. 1 depicts a storage system according to a first embodiment. A storage system 1 includes storage apparatuses 10 and 20. The storage apparatuses 10 and 20 are capable of housing a plurality of storage devices, such as HDDs and SSDs. The storage apparatuses 10 and 20 store various types of data used in processing by an information processing apparatus 30. The storage apparatus is an external storage apparatus that is externally connected to the storage apparatus 10. Note that in the storage system described here, the individual storage apparatuses are collectively managed, so that the configuration of connections and management method differ to a configuration where a master storage apparatus or a master storage control enclosure centrally manages a plurality of device enclosures.

The storage apparatus 10 and the information processing apparatus 30 are connected to a network 40. The storage apparatuses 10 and 20 are connected by a plurality of communication paths.

The storage apparatus 10 includes storage control apparatuses 11 and 12 and an enclosure 13. The storage control apparatuses 11 and 12 perform reads and writes of data to and from a plurality of storage devices housed in the enclosure 13. Volumes (for example, logical volumes) for which access control is normally performed by the storage control apparatuses 11 and 12 are set in advance. The enclosure 13 is a housing in which storage devices 13a, 13b, 13c, . . . are installed. The storage devices 13a, 13b, 13c, . . . are HDDs, for example. It is also possible to use other types of storage device, such as SSDs, in place of or together with HDDs.

The storage control apparatus 11 includes a storage unit 11a, a processing unit 11b, and ports 11c, 11d, and 11e. The storage unit 11a may be a volatile storage apparatus, such as a Random Access Memory (RAM), or a nonvolatile storage device, such as a flash memory. The processing unit 11b may include a Central Processing Unit (CPU), a Digital Signal Processor (DSP), an Application Specific Integrated Circuit (ASIC), a Field Programmable Gate Array (FPGA), or the like. The processing unit 11b may be a processor that executes a program. The expression "processor" may also include a group of a plurality of processors (or "multiprocessor").

The storage unit 11a stores first path information indicating a plurality of communication paths between the storage apparatuses 10 and 20 for each volume in the storage apparatus 20. The first path information includes information on the priority of each communication path for accessing the volume in question. The higher the priority, the smaller the number of storage control apparatuses that are passed when accessing the volume in question from the storage control apparatus 11. This is because the smaller the number of storage control apparatuses that are passed, the smaller the overhead caused by the access.

The processing unit 11b receives, from the information processing apparatus 30, an access request for a data write or a data read for a predetermined volume. When the access destination designated by the access request is a volume corresponding to a storage device in the storage apparatus 10, the processing unit 11b accesses the volume in question in the storage apparatus 10 and sends the access result to the information processing apparatus 30 in reply. On the other hand, when the access destination designated by the access request is a volume corresponding to a storage device in the storage apparatus 20, the processing unit 11b generates a command for data input/output at the corresponding volume and transmits the command to the storage apparatus 20. The processing unit 11b receives an access result corresponding to the transmitted command from the storage apparatus 20 and sends the access result to the information processing apparatus 30 as a reply.

When transmitting a command to the storage apparatus 20, the processing unit 11b decides the port to be used for transmitting the command based on the first path information stored in the storage unit 11a.

The ports 11c and 11d are communication ports connected to the storage apparatus 20. The port 11e is a communication port connected to the storage control apparatus 12.

The storage control apparatus 12 includes a storage unit 12a, a processing unit 12b, and ports 12c, 12d, and 12e. In the same way as the storage unit 11a, the storage unit 12a stores second path information. However, the priority for each communication path included in the second path information is the priority when accessing a volume inside the storage apparatus 20 from the storage control apparatus 12, and therefore differs to the priority included in the first path information.

In the same way as the processing unit 11b, in response to an access request from the information processing apparatus 30, the processing unit 12b performs access to a volume in the storage apparatus 10 or transmits a command to the storage apparatus 20. The processing unit 12b may also be instructed from the storage control apparatus 11 to transmit a command to the storage apparatus 20.

The ports 12c and 12d are communication ports connected to the storage apparatus 20. The port 12e is a communication port connected to the storage control apparatus 11. As one example, the ports 11e and 12e are connected via a cable (or via a predetermined relay apparatus provided in the storage apparatus 10).

The storage apparatus 20 includes storage control apparatuses 21 and 22 and an enclosure 23. The storage control apparatuses 21 and 22 perform reads and writes of data to and from a plurality of storage devices housed in the enclosure 23. Volumes for which access control is normally performed by the storage control apparatuses 21 and 22 are set in advance. In the same way as the enclosure 13, the enclosure 23 is a housing in which storage devices 23a, 23b, 23c, . . . , such as HDDs and SSDs, are installed.

The storage control apparatus 21 includes a storage unit 21a, a processing unit 21b, and ports 21c, 21d, and 21e. The storage unit 21a stores information to be used in processing by the processing unit 21b. The processing unit 21b performs access to a volume subjected to access control by the storage control apparatus 21 in response to a command received from the storage apparatus 10 and sends an access result to the storage apparatus 10 in reply. When the access destination of a command received from the storage apparatus 10 is subject to control by the storage control apparatus 22, the processing unit 21b transfers the command to the storage control apparatus 22.

The ports 21c and 21d are communication ports connected to the storage apparatus 10. As one example, the ports 11c and 21c are connected via a cable. The ports 12c and 21d are also connected via a cable. The port 21e is a communication port connected to the storage control apparatus 22.

The storage control apparatus 22 includes a storage unit 22a, a processing unit 22b, and ports 22c, 22d, and 22e. The storage unit 22a stores information to be used in processing by the processing unit 22b. The processing unit 22b performs access to a volume subjected to access control by the storage control apparatus 22 in response to a command received from the storage apparatus 10 and sends an access result to the storage apparatus 10 in reply. When the access destination of a command received from the storage apparatus 10 is subject to control by the storage control apparatus 21, the processing unit 22b transfers the command to the storage control apparatus 21.

The ports 22c and 22d are communication ports connected to the storage apparatus 10. As one example, the ports 11d and 22c are connected via a cable. The ports 12d and 22d are also connected via a cable. The port 22e is a communication port connected to the storage control apparatus 21. The ports 21e and 22e are connected via a cable (or via a predetermined relay apparatus provided in the storage apparatus 20).

Note that in the same way as the storage unit 11a, the storage units 12a, 21a, and 22a are a RAM or a flash memory, for example. Also, in the same way as the processing unit lib, the processing units 12b, 21b, and 22b may be a CPU, a DSP, an ASIC, an FPGA, or the like, and may be a processor (including a "multiprocessor") that executes a program.

As described above, the storage apparatus 20 includes ports 21c, 21d, 22c, and 22d that form a plurality of communication paths with the ports 11c and 11d of the storage control apparatus 11 and the ports 12c and 12d of the storage control apparatus 12. The storage apparatus 20 receives a command from the storage apparatus 10 via one of the ports 21c, 21d, 22c, and 22d, and inputs and outputs data into and from a storage device installed in the enclosure 23 based on the command.

Here, as an example, consider a case where the storage control apparatus 21 is in charge of access to a volume V1 that is present inside the storage apparatus 20. A case where the storage control apparatus 11 receives an access request for the volume V1 from the information processing apparatus 30 is described below. Note however that the storage control apparatus 12 also has the same functions as the storage control apparatus 11.

With a configuration where ports are connected as in the example described above, there are a total of four communication paths for transmitting commands from the storage control apparatus 11 to the storage control apparatus 21.

A first communication path is the communication path via the ports 11c and 21c (hereinafter referred to as the "communication path A"). A second communication path is the communication path via the ports 11d, 22c, 22e and 21e (hereinafter referred to as the "communication path B"). A third communication path is the communication path via the ports 11e, 12e, 12c, and 21d (hereinafter referred to as the "communication path C"). A fourth communication path is the communication path via the ports 11e, 12e, 12d, 22d, 22e, and 21e (hereinafter referred to as the "communication path D").

Out of these four communication paths, the processing unit 11b specifies the most recommended path for accessing the volume V1 according to a predetermined protocol, for example. SCSI (Small Computer System Interface) is a conceivable example of a usable protocol. In more detail, the processing unit 11b issues a "Report Target Port Groups" SCSI command designating the volume V1 to the storage apparatus 20.

Here, in response to the Report Target Port Groups command, the storage apparatus 20 sends a reply that recommends the communication path A via the ports 11c and 21c and a communication path via the ports 12c and 21d (which corresponds to the communication path C). On the other hand, the storage apparatus 20 sends a reply indicating that a communication path via the ports 11d and 22c (which corresponds to the communication path B) and a communication path via the ports 12d and 22d (which corresponds to the communication path D) are not recommended.

The storage apparatus 20 replies in this way because the storage control apparatus 21 is in charge of access to the volume V1. In other words, the storage apparatus 20 sends a reply recommending a communication path that inputs a command from outside directly into a port at the storage control apparatus 21, not at the storage control apparatus 22. The communication paths indicated as recommended in the reply are communication paths that minimize the number of storage control apparatuses that are passed on the storage apparatus 20 side when accessing the volume V1 in question.

From the reply to the Report Target Port Groups command received from the storage apparatus 20, the processing unit 11b specifies the most recommended port when accessing the volume V1. More specifically, the processing unit 11b specifies the port 11c of the storage control apparatus 11 to which the processing unit 11b belongs, out of the ports 11c and 12c of the storage apparatus 10 that belong to the communication paths A and C that were recommended in the reply. The port 11c is the port with the highest priority when selecting a port to access the volume V1.

Next, the processing unit 11b sets the port 11d of the storage control apparatus 11 as the port with the second highest priority. This is because the overhead on the storage apparatus 10 side is reduced by transmitting a command without passing the storage control apparatus 12.

After this, the processing unit 11b sets the port 12c of the storage control apparatus 12 as the port with the third highest priority. This is because out of the communication path via the ports 12c and 21d and the communication path via the ports 12d and 22d of the storage control apparatus 12 that remain, the communication path via the ports 12c and 21d includes the port 12c that was recommended in the reply received from the storage apparatus 20.

The processing unit 11b then sets the remaining port 12d as the port with the fourth highest priority (that is, the lowest priority out of the ports 11c, 11d, 12c, and 12d).

The processing unit 11b stores information on communication paths and the priorities of the ports belonging to the communication paths in the storage unit 11a. Since the port 11c has the highest priority for accessing the volume V1, the port 11c is normally used when accessing the volume V1.

In this description, out of the plurality of communication paths between the storage apparatuses 10 and 20, the communication path currently being used to transmit commands to the storage apparatus 20 (for example, the communication path A via the port 11c) is referred to as the "first communication path".

Based on the processing status of inputs and outputs via the first communication path, the processing unit 11b switches the port used to transmit the next command to the storage apparatus 20 to a port belonging to a second communication path out of the plurality of communication paths. As one example, the processing unit 11b grasps the processing state of inputs and outputs via the communication path (for example, the communication path A) to which a port belongs based on the number of commands that have been issued to the port (for example, the port 11c) but for which a response has not been received. The number of commands that have been issued but for which a response has not been received corresponds to the number of commands that have not been completed. Hereinafter, a command for which a response has not been received is referred to as a "pending command". It is conceivable for the processing unit 11b to count the number of pending commands for each of the ports 11c, 11d, and 11e and store the numbers in the storage unit 11a. The larger the number of pending commands, the more often processing for data inputs and outputs via the corresponding communication path will be delayed for some reason.

For this reason, as one example, when the number of pending commands has reached a threshold for the port in use, the processing unit 11b switches the port to be used to transmit the next command to the storage apparatus to a port that belongs to the second communication path.

More specifically, when the number of pending commands for the port 11c belonging to the communication path A currently being used to transmit commands has reached a threshold, the processing unit 11b chooses one of the ports 11d, 12c, and 12d that has a lower priority than the port 11c as the port to be used to transmit the next command. When doing so, the processing unit 11b may decide the port to be used to transmit the next command according to the respective priorities of the ports. As one example, the processing unit 11b may decide, as the port to be used to transmit the next command, a port for which the number of pending commands has not reached the threshold. Here, the ports 12c and 12d are ports of the storage control apparatus 12. Accordingly, the processing unit 11b may determine whether to transmit the next command to the storage apparatus 20 via the port 12c or the port 12d of the storage control apparatus 12 based on the number of pending commands that have been issued for the port 11e.

For a configuration like the storage system 1 where a plurality of communication paths are provided from the storage apparatus 10 to the storage apparatus 20, it is conceivable to switch between the communication paths to distribute accesses across the plurality of communication paths. However, the storage apparatus 10 is incapable of monitoring the operating states of the physical elements included in the storage apparatus 20 (the storage control apparatuses 21 and 22, the ports 21c, 21d, 22c, and 22d for communicating with the storage apparatus 10, and the storage devices 23a, 23b, 23c, and the like). This means that it is difficult for the storage apparatus 10 to observe changes in operation states at the storage apparatus 20 and determine the timing for switching the communication path.

For this reason, based on the processing state of inputs and outputs via the first communication path that is currently being used, the storage apparatus 10 switches the port to be used to transmit the next command to a port that belongs to a second communication path that differs to the first communication path. As one example, from the number of pending commands for a port belonging to the first communication path, the storage apparatus 10 detects the possibility of delays occurring for some reason in input/output processing for the storage apparatus 20 and switches the port in use. By doing so, the storage apparatus 10 becomes capable of switching the port (or communication path) used for transmitting commands at appropriate timing, even without directly grasping operation states at the storage apparatus 20. In addition, it is possible to distribute the input/output processing to another communication path (or another port) before a delay occurs in data input/output processes for the storage apparatus 20.

In particular, the larger the number of pending commands, the larger the amount of memory resources used for each port. On the other hand, there is an upper limit on the memory resources allocated to each port. This means that by switching the communication path for communicating with the storage apparatus 20 as described above, there is a further advantage that it becomes possible to make distributed use of the memory resources corresponding to the respective ports of the storage apparatus 10. By preferentially using communication paths with high priorities, it is possible to ensure a certain I/O performance for the storage apparatus 20, for the storage control apparatus 11 to appropriately control the access flow to the storage apparatus 20, and to make efficient use of the resources of the storage control apparatus 11.

Note that the storage apparatuses 10 and 20 may each include three or more storage control apparatuses. As one example, the three or more storage control apparatuses in the same storage apparatus are connected to a predetermined relay apparatus. With this configuration, two storage control apparatuses in the same storage apparatus communicate with each other via the relay apparatus. Even when the storage apparatuses 10 and 20 each include three or more storage control apparatuses, it is possible to provide a plurality of communication paths between the storage apparatuses 10 and 20. This means that even when the storage apparatus 10 is equipped with three or more storage control apparatuses, control that switches the port to be used to transmit the next command to a port belonging to the second communication path may be performed based on the processing state of inputs and outputs via the first communication path that is currently in use. The respective ports of the storage apparatus 10 and the respective ports of the storage apparatus 20 may be directly connected by cables or may be connected via switches.

The functions of the storage apparatus 10 will now be described in more detail for a more specific example of a storage system.

Second Embodiment

Figure 2:
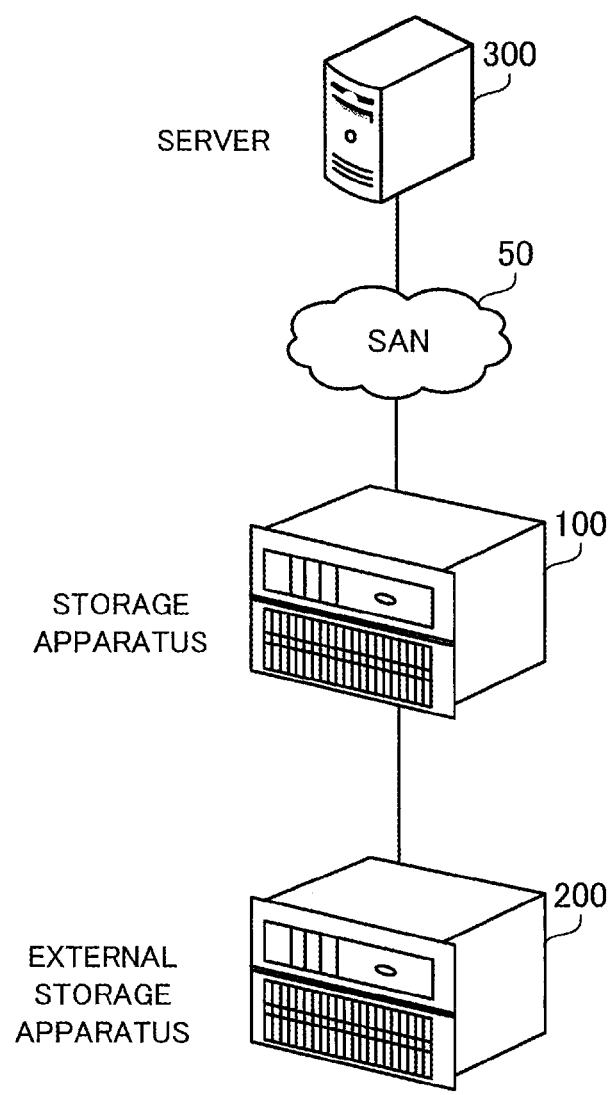
FIG. 2 depicts an example of a storage system according to a second embodiment.

FIG. 2 depicts an example of a storage system according to a second embodiment. The storage system according to the second embodiment includes a storage apparatus 100 and an external storage apparatus 200. The external storage apparatus 200 is connected to the storage apparatus 100. The storage apparatus 100 is also connected to a Storage Area Network (SAN) 50. A server 300 is connected to the SAN 50. As one example, a fiber channel is used as an interface between the SAN 50 and/or the storage apparatus 100 and the external storage apparatus 200.

The storage apparatus 100 stores data used in processing by the server 300. The storage apparatus 100 receives, from the server 300, an access request for a logical volume provided by the storage apparatus 100 or the external storage apparatus 200. As examples, the access request is a request such as a data write to a logical volume or a data read from a logical volume.

When the access destination of an access request is a logical volume in the storage apparatus 100, the storage apparatus 100 executes access to the logical volume and sends the access result in reply to the server 300.

On the other hand, when the access destination of an access request is a logical volume in the external storage apparatus 200, the storage apparatus 100 issues a command (or "I/O command") instructing the inputting or outputting of data to or from the logical volume in question and transmits the command to the external storage apparatus 200. The storage apparatus 100 receives the access result corresponding to the I/O command from the external storage apparatus 200, and sends the access result in reply to the server 300. In other words, the storage apparatus 100 functions as an initiator and the external storage apparatus 200 functions as the target. Note that the storage apparatus 100 is an example of the storage apparatus 10 in the first embodiment.

The external storage apparatus 200 stores data to be used in the processing by the server 300. The external storage apparatus 200 receives an I/O command from the storage apparatus 100, accesses data in response to the I/O command, and transmits the access result to the storage apparatus 100. The external storage apparatus 200 is an example of the storage apparatus 20 in the first embodiment.

The server 300 is a server computer that accesses data stored in the storage apparatus 100 and the external storage apparatus 200. The server 300 is an example of the information processing apparatus 30 in the first embodiment.

Figure 3:
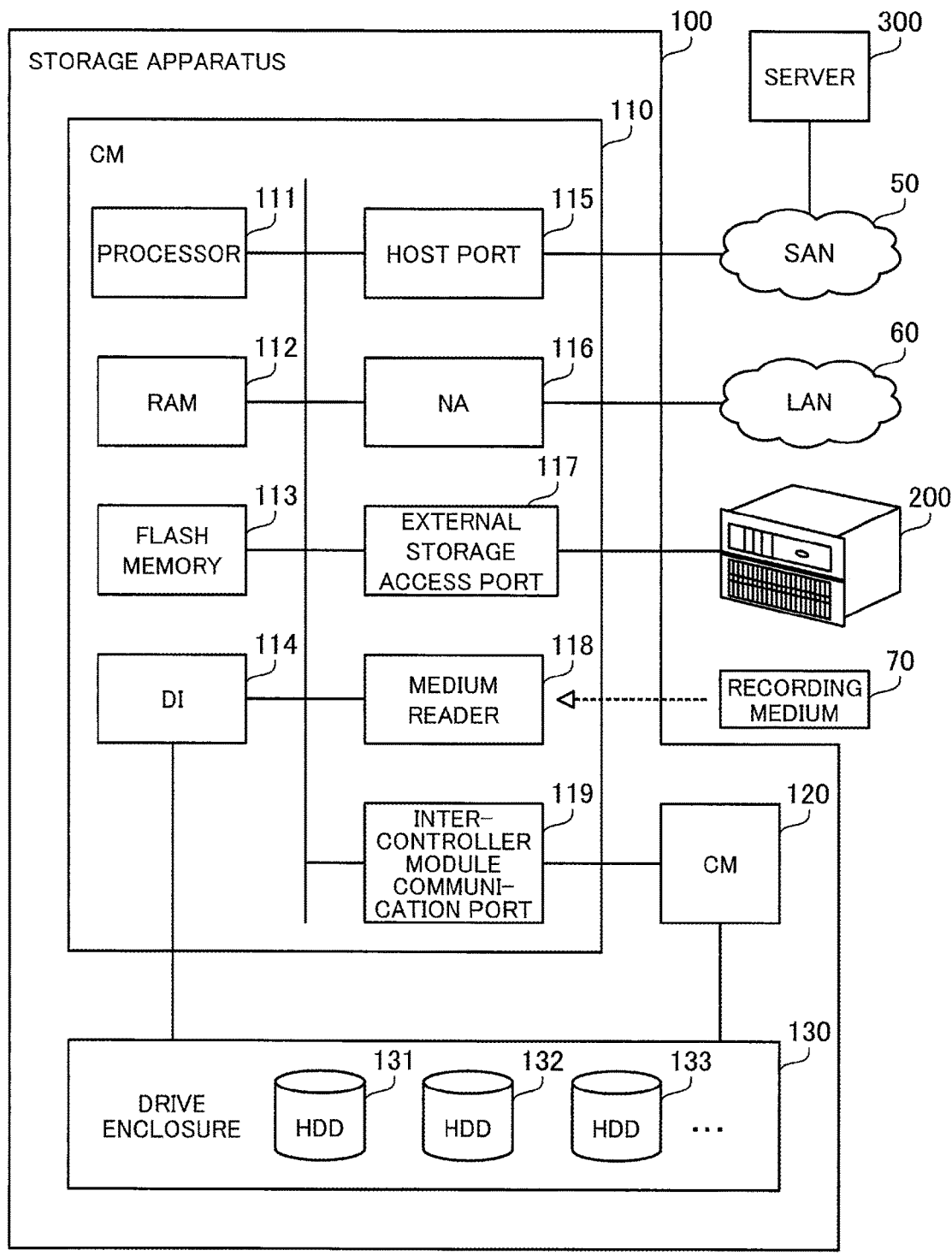
FIG. 3 depicts example hardware of a storage apparatus.

FIG. 3 depicts example hardware of a storage apparatus. The storage apparatus 100 includes controller modules (CMs) 110 and 120 and a drive enclosure 130. The external storage apparatus 200 also has the same hardware as the storage apparatus 100.

The controller modules 110 and 120 are storage control apparatuses that control access to a plurality of HDDs housed in the drive enclosure 130. For example, the drive enclosure 130 has HDDs 131, 132, 133, . . . . The drive enclosure 130 may house other types of storage device, such as SSDs, in place of or together with the HDDs.

The controller modules 110 and 120 combine the plurality of HDDs housed in the drive enclosure 130 to construct logical storage regions according to Redundant Arrays of Inexpensive Disks (RAID) technology, and store data to be used in processing by the server 300 in these storage regions. As one example, the server 300 regards a logical storage region as one logical volume. The controller modules 110 and 120 associate identification information of an access destination volume designated from the server 300 with identification information (a logical unit number or "LUN") of a logical unit (or "LU") managed in the storage apparatus 100 and the external storage apparatus 200.

Note that the controller modules 110 and 120 are examples of the storage control apparatuses 11 and 12 in the first embodiment.

The controller module 110 includes a processor 111, a RAM 112, a flash memory 113, a drive interface (DI) 114, a host port 115, a network adapter (NA) 116, an external storage access port 117, a medium reader 118 and an inter-controller module communication port 119. This hardware is connected to a bus inside the controller module 110. The controller module 120 also has the same hardware as the controller module 110.

The processor 111 is hardware that controls information processing by the controller module 110. The processor 111 may be a multiprocessor. As examples, the processor 111 is a CPU, a DSP, an ASIC, or an FPGA. Alternatively, the processor 111 may be a combination of two or more of a CPU, a DSP, an ASIC, an FPGA, and the like.

The RAM 112 is a main storage apparatus of the controller module 110. The RAM 112 is a volatile semiconductor memory. As examples, a Static RAM (SRAM), a Dynamic RAM (DRAM), or the like is used as the RAM 112. The RAM 112 temporarily stores at least a part of a program of an OS and firmware executed by the processor 111. The RAM 112 also stores various data used in processing by the processor 111.

The flash memory 113 is an auxiliary storage apparatus of the controller module 110. The flash memory 113 is a nonvolatile semiconductor memory and stores programs, including an OS and firmware, various data, and the like.

The drive interface 114 is an interface for communicating with the drive enclosure 130. As one example, an interface such as a Serial Attached SCSI (SAS) is used as the drive interface 114.

The host port 115 is a communication interface connected to the SAN 50. The host port 115 communicates via the SAN 50 with the server 300 connected to the SAN 50. As one example, a fiber channel interface is used as the host port 115. Note that the controller module 110 has a plurality of host ports 115. The host ports 115 may be referred to as "channel adapters".

The network adapter 116 is a communication interface that communicates with another computer via a Local Area Network (LAN) 60. As one example, an Ethernet (registered trademark) interface is used as the network adapter 116.

The external storage access port 117 is a communication interface connected to the external storage apparatus 200. As one example, a fiber channel interface is used as the external storage access port 117. The external storage access port 117 may be connected to the external storage apparatus 200 via a predetermined switch (for example, a fiber channel switch). Note that the controller module 110 has a plurality of external storage access ports 117. Here, the external storage access port 117 is a different interface to the drive interface 114 for connecting to the drive enclosure 130 (internal storage), and/or a different type of interface to the drive interface 114. The external storage access port 117 may also be referred to as a host port (or channel adapter).

The medium reader 118 is an apparatus that reads a program and data stored on the recording medium 70. As one example, a nonvolatile semiconductor memory, such as a flash memory card, is used as the recording medium 70. In accordance with a command from the processor 111, for example, the medium reader 118 stores the program and data read from the recording medium 70 into the RAM 112 and/or the flash memory 113.

The inter-controller module communication port 119 is an interface for connecting with the controller module 120. By communicating with the controller module 120 via the inter-controller module communication port 119, the controller module 110 performs data accesses in cooperation with the controller module 120. As one example, both controller modules 110 and 120 form an active system so that data accesses are distributed between the controller modules 110 and 120. When one controller module fails, data accesses are taken over by the other controller module, thereby preventing the user's work from being interrupted. Note that although the following description focuses on the controller module 110, the controller module 120 has the same functions as the controller module 110.

Figure 4:
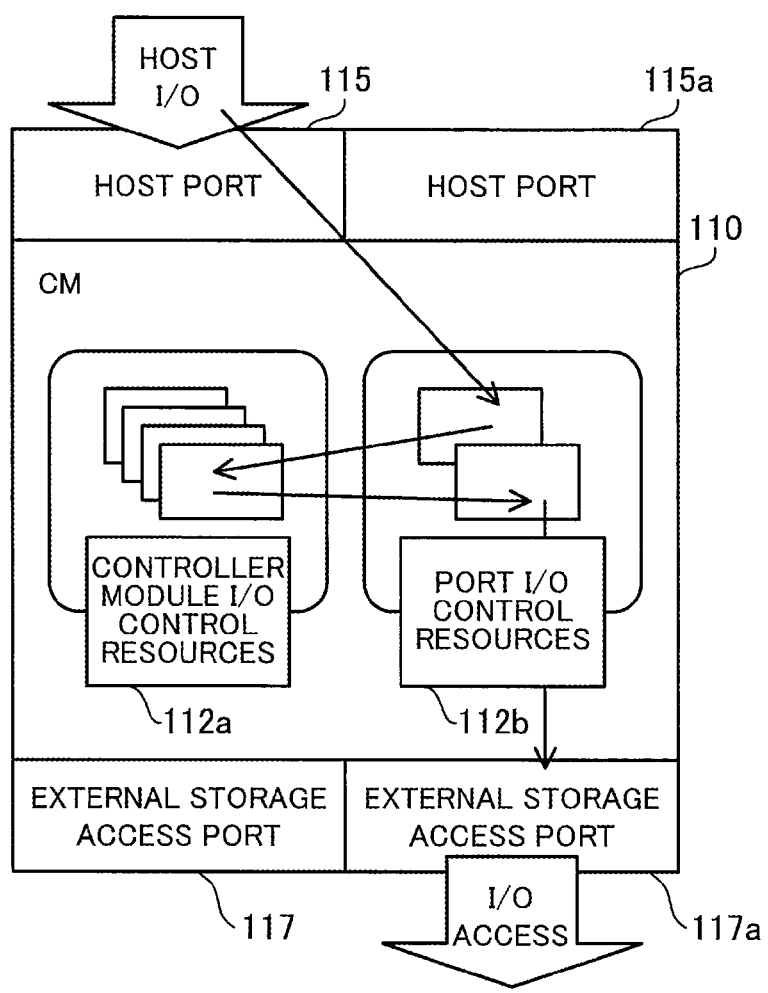
FIG. 4 depicts an example of access to an external storage apparatus.

FIG. 4 depicts an example of access to the external storage apparatus. In addition to the host port 115 and the external storage access port 117, the controller module 110 also has a host port 115a and an external storage access port 117a.

Here, the controller module 110 performs I/O control using a cache realized by a predetermined storage region of the RAM 112. As one example, the controller module 110 reads data stored in the cache in response to a read access request (host I/O) from the server 300 and sends the data in reply to the server 300. Also, in response to a write access request from the server 300, the controller module 110 writes the data subjected to the write into the cache, and sends a write completion indication to the server 300 in reply. In this case, the controller module 110 executes data writes to a nonvolatile storage medium, such as an HDD, asynchronously with the access requests from the server 300.

To perform such I/O control, the RAM 112 has controller module I/O control resources 112a and port I/O control resources 112b as I/O control resources.

The controller module I/O control resources 112a are units of a memory resource that enable I/O processing to be performed using the controller module 110.

The port I/O control resources 112b are units of a memory resource that enables I/O processing to be performed using the host ports 115 and 115a and the external storage access ports 117 and 117a.

As one example, when the controller module 110 receives a host I/O via the host port 115 and performs I/O access to the external storage apparatus 200 using the external storage access port 117a, the resources are used as follows.

Firstly, the host port 115 that has received the host I/O acquires one port I/O control resource 112b in order to perform I/O processing.

Secondly, the controller module 110 that requested the I/O processing using the host port 115 acquires one controller module I/O control resource 112a in order to internally process the command.

Thirdly, to perform I/O access to the external storage apparatus 200, the controller module 110 requests the external storage access port 117a to give an I/O instruction.

Fourthly, the external storage access port 117a that received the I/O instruction acquires one port I/O control resource 112b for issuing an I/O.

The operation described above means that a comparatively large number of port I/O control resources 112b are allocated to external storage access ports that are frequently used. However, there is a limit on the memory resources to be allocated to the port I/O control resources 112b, and an upper limit on the number of I/O to be issued by one external storage access port. This means that when only a specified external storage access port continues to be used, there is the risk that the controller module 110 will not be able to process all of the I/O accesses to the external storage apparatus 200.

Figure 5:
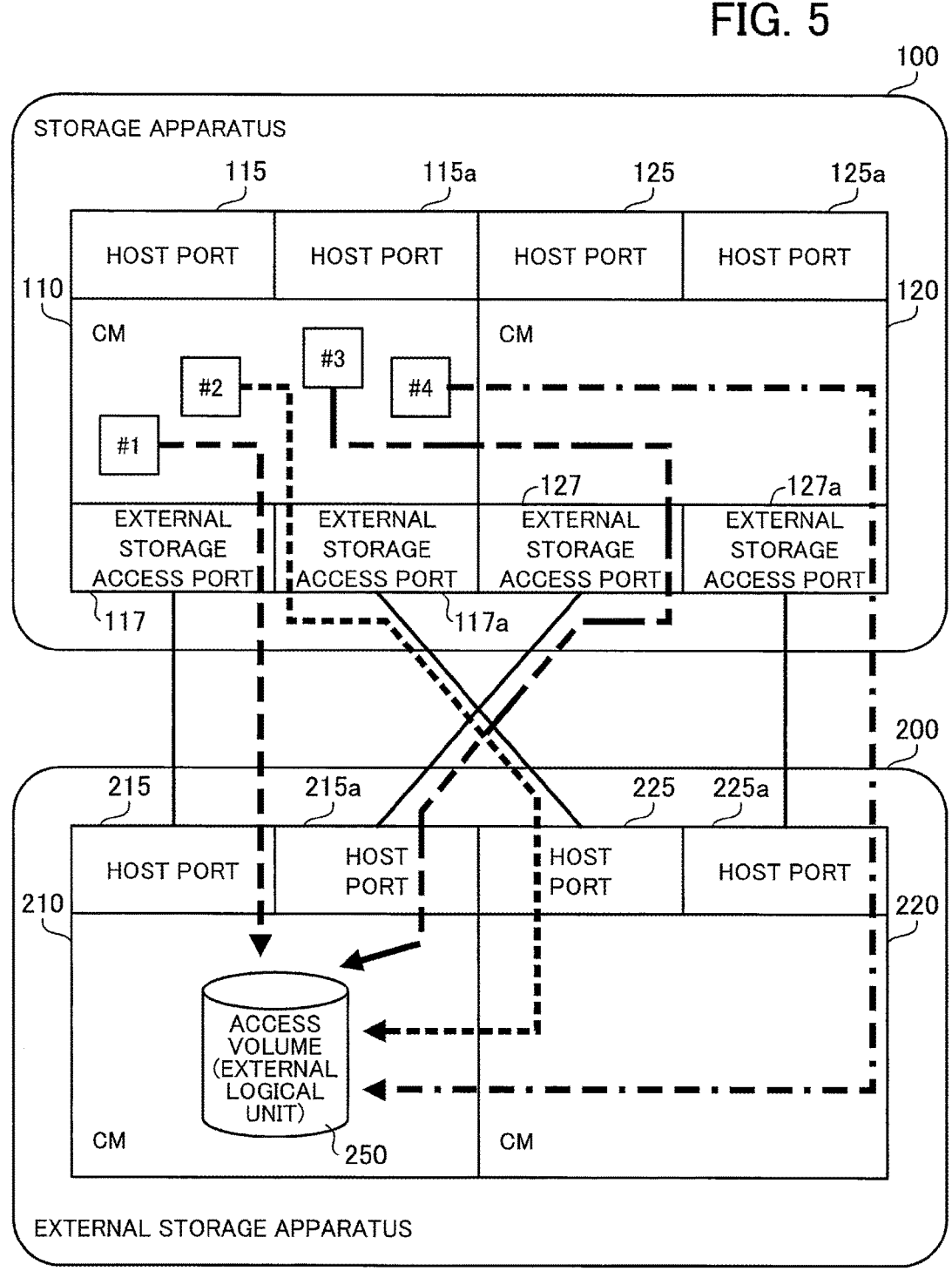
FIG. 5 depicts examples of paths.

FIG. 5 depicts examples of paths. The external storage apparatus 200 has controller modules 210 and 220. The controller modules 210 and 220 are connected to each other by inter-controller module communication interfaces (not illustrated) provided in the controller modules 210 and 220. The controller module 210 has host ports 215 and 215a. The controller module 220 has host ports 225 and 225a.

The storage apparatus 100 and the external storage apparatus 200 are connected as follows by cables. The external storage access port 117 and the host port 215 are connected. The external storage access port 117a and the host port 225 are connected. The external storage access port 127 and the host port 215a are connected. The external storage access port 127a and the host port 225a are connected.

Here, logical units for which the respective controller modules are in charge of access are decided in advance. It is assumed that the controller module 210 is in charge of access to an access volume 250 (or "external logical units"). The external logical units are logical units present in the external storage apparatus 200.

In this example, there are four paths (communication paths), Paths#1, #2, #3, and #4, for accessing the access volume 250 from the controller module 110.

Path#1 is a path that passes via the external storage access port 117 and the host port 215. Path#2 is a path that passes via the external storage access port 117a and the host port 225. Path#3 is a path that passes via the external storage access port 127 and the host port 215a. Path#4 is a path that passes through the external storage access port 127a and the host port 225a. Note that replies from the external storage apparatus 200 are sent back via the same path as during access.

To improve the access performance of a given controller module to an external logical unit, it is preferable for a low number of controller modules to be interposed between the accessing controller module and the external logical unit. This is because when communication occurs between the controller modules 110 and 120 inside the storage apparatus 100 and/or between the controller modules 210 and 220 in the external storage apparatus 200, this lowers the access performance due to the overheads used in communication.

In the example of FIG. 5, when accessing the access volume 250 from the controller module 110, access performance is highest when Path#1 is used. Conversely, access performance is lowest when Path#4 is used.

As one example, consider a case where Path#1 is always used to access the access volume 250 from the controller module 110. As described above with reference to FIG. 4, since the memory resources of the RAM 112 are limited, there is an upper limit on the number of I/Os that may be issued for one external storage access port. This means that when the number of unprocessed I/Os increases for some reason, such as a high load state at the external storage apparatus 200, or the number of accesses to the corresponding external logical unit increases and accesses beyond the upper limit occur, there is the risk of a fall in access performance for Path#1. On the other hand, it is also conceivable for the controller module 110 to access the access volume 250 by using each external storage access port in a round-robin arrangement. However, as described above, as the number of controller modules passed from the controller module 110 to the access volume 250 increases, the access performance falls due to overheads of communication between the controller modules.

The controller module 110 is not capable of directly monitoring the operation states of hardware (for example, the controller modules 210 and 220) of the external storage apparatus 200. This means that it is difficult to monitor the load of the hardware of the external storage apparatus 200 and to switch the external storage access port used for I/O access to the external logical units.

For this reason, the controller module 110 provides a function of switching at appropriate timing between the external storage access ports 117, 117a, 127, and 127a used for I/O access to the respective external logical units.

Figure 6:
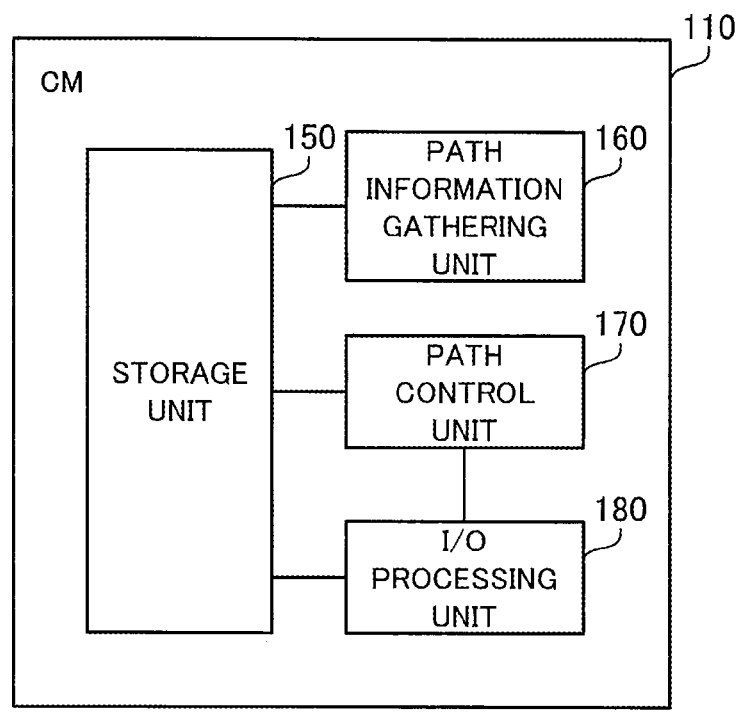
FIG. 6 depicts example functions of a controller module.

FIG. 6 depicts example functions of a controller module. The controller module 110 includes a storage unit 150, a path information gathering unit 160, a path control unit 170, and an I/O processing unit 180. The storage unit 150 is realized using a storage region of the RAM 112 and/or the flash memory 113. The path information gathering unit 160, the path control unit 170, and the I/O processing unit 180 are realized by the processor 111. As one example, by executing a program stored in the RAM 112, the processor 111 realizes the functions of the path information gathering unit 160, the path control unit 170, and the I/O processing unit 180. Alternatively, the path information gathering unit 160, the path control unit 170, and the I/O processing unit 180 may be realized by hard-wired logic, such as an FPGA or an ASIC.

The storage unit 150 stores external logical unit path information on a plurality of paths for accessing each external logical unit. The storage unit 150 also stores an I/O execution count for the external storage access ports 117 and 117a of the same controller module (that is, the controller module 110) and a communication execution count for the inter-controller module communication port 119.

The storage unit 150 also includes an I/O issuing queue for managing the queuing of I/O commands by the external storage access ports 117 and 117a. The storage unit 150 further includes an inter-controller module communication queue for managing the queuing of I/O commands via the controller module 120.

The path information gathering unit 160 gathers information on a plurality of paths formed between the storage apparatus 100 and the external storage apparatus 200. As one example, the path information gathering unit 160 uses predetermined SCSI commands to gather, from the external storage apparatus 200, information (or "recommended path information") on paths that are recommended for access to an external logical unit and non-recommended paths, out of a plurality of paths. The path information gathering unit 160 gathers the recommended path information for each external logical unit. As a specific example, the path information gathering unit 160 gathers the recommended path information for each external logical unit by transmitting a Report Target Port Groups command designating the external logical unit in question to the external storage apparatus 200.

The path information gathering unit 160 generates external logical unit path information for each external logical unit path based on the gathered recommended path information and stores the external logical unit path information in the storage unit 150. The external logical unit path information includes path information indicating a path that may be used to access an external logical unit path. The external logical unit path information also includes abnormal path information. The abnormal path information is information indicating paths where an abnormality, such as an access abnormality (when there has been no response, an abnormal response, or the like) or an abnormality such as "link down" has been detected.

The path control unit 170 monitors the I/O execution counts for the external storage access ports 117 and 117a and the communication execution count for the inter-controller module communication port 119 and stores the counts in the storage unit 150. Here, the I/O execution count of an external storage access port corresponds to the number of pending I/O commands that are yet to acquire a response from the external storage apparatus 200, out of the I/O commands issued to the external storage access port in question. The communication execution count of the inter-controller module communication port 119 corresponds to the number of pending I/O commands that are yet to acquire a response from the external storage apparatus 200 (that is, a response via the controller module 120), out of the I/O commands issued to the inter-controller module communication port 119.

The path control unit 170 switches paths for accessing an external logical unit. The path control unit 170 performs path switching based on the external logical unit path information stored in the storage unit 150, the I/O execution counts of the external storage access ports 117 and 117a, and the communication execution count of the inter-controller module communication port 119. In more detail, the path control unit 170 switches, based on the processing state of the inputs/outputs via the path currently being used to transmit commands to external logical units in the external storage apparatus 200, the external storage access port used to transmit the next command to the external logical unit in the external storage apparatus 200 to another external storage access port belonging to another path.

In response to access requests from the server 300, the I/O processing unit 180 accesses data stored in the storage apparatus 100 and data stored in the external logical units of the external storage apparatus 200. On accessing the data stored in the storage apparatus 100, the I/O processing unit 180 sends the access result (read data, a result of a data write, or the like) in reply to the server 300. When accessing the data stored in an external logical unit, the I/O processing unit 180 functions as an initiator as described earlier and issues an I/O command for an external logical unit to the external storage apparatus 200 that acts as the target. The I/O processing unit 180 receives an access result corresponding to the I/O command from the external storage apparatus 200 and sends the access result in reply to the server 300.

When accessing an external logical unit, the I/O processing unit 180 normally transmits an I/O command using the recommended path for the external logical unit. Here, the recommended path is a path that is currently thought to have the highest access performance for the external logical unit in question. However, the path for accessing the external logical unit may be switched by the path control unit 170. When this happens, the I/O processing unit 180 uses the path after switching to transmit an I/O command for accessing the external logical unit to the external storage apparatus 200.

Examples of identification information of each controller module and each port are given below.

Figure 7:
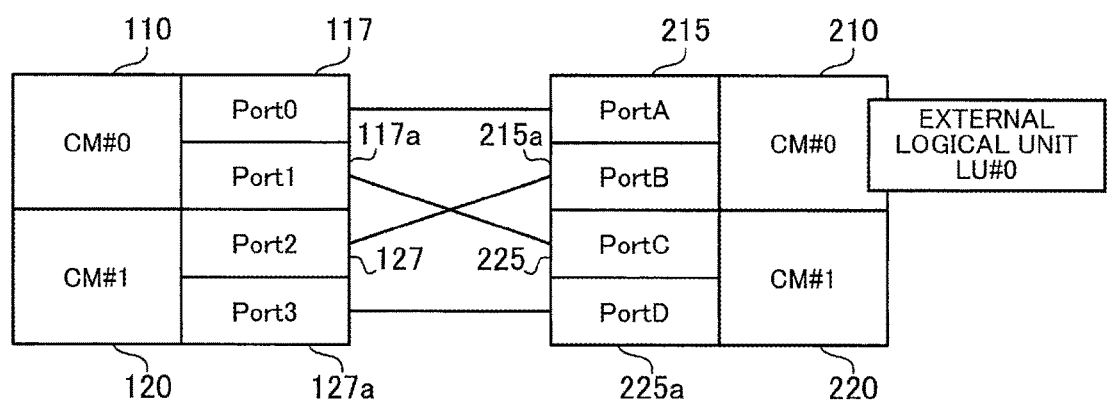
FIG. 7 depicts examples of identification information of controller modules and ports.

FIG. 7 depicts examples of identification information of controller modules and ports. The identification information of the controller module 110 in the storage apparatus 100 is "CM#0". The identification information of the controller module 120 in the storage apparatus 100 is "CM#1". The identification information of the controller module 210 in the external storage apparatus 200 is "CM#0". The identification information of the controller module 220 in the external storage apparatus 200 is "CM#1".

The identification information of the external storage access port 117 is "Port0". The identification information of the external storage access port 117a is "Port1". The identification information of the external storage access port 127 is "Port2". The identification information of the external storage access port 127a is "Port3".

The identification information of the host port 215 is "PortA". The identification information of the host port 215a is "PortB". The identification information of the host port 225 is "PortC". The identification information of the host port 225a is "PortD".

The plurality of paths formed between the external storage access ports 117, 117a, 127, and 127a of the storage apparatus 100 and the host ports 215, 215a, 225, and 225a of the external storage apparatus 200 are identified by a combination of information identifying the respective ports.

As one example, the path to which the external storage access port 117 and the host port 215 belong is "Port0-PortA". Here, it is assumed that one of the external logical units subject to access control by the controller module 210 is external logical unit LU#0. When this is the case, the path "Port0-PortA" corresponds to Path#1 from the controller module 110 to the external logical unit LU#0.

The path to which the external storage access port 117a and the host port 225 belong is "Port1-PortC". The path "Port1-PortC" corresponds to Path#2 from the controller module 110 to the external logical unit LU#0.

The path to which the external storage access port 127 and the host port 215a belong is "Port2-PortB". The path "Port2-PortB" corresponds to Path#3 from the controller module 110 to the external logical unit LU#0.

In addition, the path to which the external storage access port 127a and the host port 225a belong is "Port3-PortD". The path "Port3-PortD" corresponds to Path#4 from the controller module 110 to the external logical unit LU#0.

FIG. 8 depicts an example of recommended path information acquired for external logical unit LU#0. The path information gathering unit 160 transmits a Report Target Port Groups command designating the external logical unit LU#0 to the external storage apparatus 200. The external storage apparatus 200 responds to the path information gathering unit 160 with recommended path information indicating "recommended" or "not-recommended" for each path to external logical unit LU#0. This response is called a "Report Target Port Groups response".

As one example, for the path configuration depicted in FIG. 7, the path "Port0-PortA" is recommended but the path "Port1-PortC" is not recommended. Likewise, the path "Port2-PortB" path is recommended but the path "Port3-PortD" is not-recommended.

The reason why the external storage apparatus 200 returns this type of response is that the controller module that is in charge of access to the external logical unit LU#0 at the external storage apparatus 200 is the controller module 210, so that paths where I/O commands are directly inputted into the controller module 210 (without passing via the controller module 220) are determined as "recommended". That is, in the Report Target Port Groups response, paths that have no overheads due to communication between the controller modules in the external storage apparatus 200 when accessing the external logical unit LU#0 are recommended, and other paths are not recommended. That is, the paths indicated as recommended in the response are paths where the smallest number of controller modules are passed inside the external storage apparatus 200.

Out of the path "Port0-PortA" and the path "Port2-PortB" that are recommended in the Report Target Port Groups responses, the path information gathering unit 160 decides on the path "Port0-PortA" including the external storage access port 117 (that is, "Port0") of the same controller module (that is, the controller module 110) as the highest priority path.

FIG. 9 depicts example settings of access paths for external logical unit LU#0. The path information gathering unit 160 determines the priority of each path formed between the storage apparatus 100 and the external storage apparatus 200 as follows.

Firstly, the path information gathering unit 160 sets the path "Port0-PortA" as having the highest priority. Here, as one example, it is assumed that the priorities are represented by integer values of 1 or higher so that the lower the number, the higher the priority. This means that the highest priority is "1". The path name of the highest priority path is "this apparatus (straight)-external storage (straight)". Here, the expression "this apparatus" refers to the storage apparatus 100. The expression "this apparatus (straight)" indicates a path where communication does not occur between the controller modules 110 and 120 inside the storage apparatus 100. Likewise, "external storage (straight)" indicates a path where communication does not occur between the controller modules 210 and 220 inside the external storage apparatus 200.

Next, out of the paths for which the Report Target Port Groups responses have been gathered (aside from the path with the priority "1"), the path information gathering unit 160 sets the priority of the path "Port1-PortC" to which a port of the controller module 110 belongs at "2". The path name of the path "Port1-PortC" is "this apparatus (straight)-external storage (cross)". Here, the expression "external storage (cross)" indicates a path where communication is performed between the controller modules 210 and 220 inside the external storage apparatus 200. The path "Port1-PortC" is set the priority "2" out of the remaining paths because transmitting a command without passing via the controller module 120 reduces the overhead at the storage apparatus 100. Here, reducing the overhead at the front-end side (in this example, the storage apparatus 100) for the server 300 rather than at the back end (in this example, the external storage apparatus 200) speeds up response to access requests of the server 300.

Next, out of the paths for which the Report Target Port Groups responses have been gathered (aside from the path with the priorities "1" and "2"), the path information gathering unit 160 sets the priority of the path "Port2-PortB" that was indicated as "recommended" in the response at the priority "3". The path name of the path "Port2-PortB" is "this apparatus (cross)-external storage (straight)". Here, the expression "this apparatus (cross)" indicates a path where communication is performed between the controller modules 110 and 120 inside the storage apparatus 100. The path "Port2-PortB" out of the remaining paths is set the priority "3" because the external logical unit LU#0 may be accessed without an overhead being caused by communication between the controller modules on the external storage apparatus 200 side.

After this, out of the paths for which the Report Target Port Groups responses have been gathered (aside from the paths with the priorities "1", "2", and "3"), the path information gathering unit 160 sets the priority of the path "Port3-PortD" that was indicated as "not recommended" in the response at the priority "4". The path name of the path "Port3-PortD" is "this apparatus (cross)-external storage (cross)".

In this way, the path information gathering unit 160 acquires recommended path information, which indicates a recommended path for accessing an external logical unit of the external storage apparatus 200 out of the plurality of paths, for each external logical unit from the external storage apparatus 200. Based on the recommended path information, the path information gathering unit 160 decides the priority of each of the plurality of paths when selecting the port that is to be switched to for each external logical unit.

Here, the path information gathering unit 160 increases the priority as the number of controller modules passed through to reach the external logical unit that is the access destination falls. Out of the plurality of paths, the path information gathering unit 160 also sets the priority of the paths that pass via an external access port of the same controller module (that is, the controller module 110) higher than the priority of paths that pass via an external access port of the controller module 120.

The path information gathering unit 160 registers information on the paths decided in this way in the external logical unit path information so as to be associated with the identification information of the external logical unit LU#0. The path information gathering unit 160 generates the external logical unit path information for each external logical unit.

FIG. 10 depicts an example of the external logical unit path information. The external logical unit path information 151 is stored in the storage unit 150. As one example, the external logical unit path information 151 indicates information relating to the external logical unit LU#0.

As one example, the external logical unit path information 151 includes fields for the external logical unit, the path information "this apparatus (straight)-external storage (straight)", the path information "this apparatus (straight)-external storage (cross)", the path information "this apparatus (cross)-external storage (straight)", the path information "this apparatus (cross)-external storage (cross)", and abnormal path information.

Identification information indicating the external logical unit LU#0 is set in the "external logical unit" field. In the field for the path information "this apparatus (straight)-external storage (straight)", the pair of ports "Port0-PortA" belonging to this path and the priority "1" are set. In the field for the path information "this apparatus (straight)-external storage (cross)", the pair of ports "Port1-PortC" belonging to this path and the priority "2" are set. In the field for the path information "this apparatus (cross)-external storage (straight)", the pair of ports "Port2-PortB" belonging to this path and the priority "3" are set. In the field for the path information "this apparatus (cross)-external storage (cross)", the pair of ports "Port3-PortD" belonging to this path and the priority "4" are set. In the abnormal path information field, identification information of paths including external storage access ports where an access abnormality for the external logical unit or a physical disconnection, such as a "link down", has been detected is set. When an abnormality has not been detected for any of the external storage access ports, the abnormal path information field is empty.

Similar information to the external logical unit path information 151 is stored for the other external logical units in the storage unit 150.

FIG. 11 depicts an example of an I/O management table. The I/O management table 152 is stored in the storage unit 150. The I/O management table 152 is information for managing the number of issued I/O commands for each of the external storage access ports 117 and 117a and the inter-controller module communication port 119 of the controller module 110. As one example, the controller module 120 has an I/O management table for managing the number of I/O commands issued to the external storage access ports 127 and 127a and the inter-controller module communication port of the controller module 120.

The I/O management table 152 includes inter-controller module communication execution count and a Port0-I/O execution count, a Port1-I/O execution count, . . . , a PortN-I/O execution count (where N is an integer of 1 or higher, in the present embodiment, N=1) fields.

In the inter-controller module communication execution count field, the number of pending I/O commands that are yet to receive a response out of the I/O commands issued from the controller module 110 to the inter-controller module communication port 119 is recorded. In the Port0-I/O execution count field, the number of pending I/O commands out of the I/O commands issued by the controller module 110 via the external storage access port 117 (that is, Port0) is recorded. In the Port1-I/O execution count field, the number of pending I/O commands out of the I/O commands issued by the controller module 110 via the external storage access port 117a (that is, Port1) is recorded.

Note that even when the controller module 110 has three or more external storage access ports, an I/O execution count is recorded in the same way for each external storage access port.

The path control unit 170 selects the path to be used to transmit an I/O command based on the external logical unit path information 151 and the I/O management table 152. Next, the path selection logic used by the path control unit 170 will be described.

FIG. 12 depicts an example of path selection logic. A path selection logic table 80 depicts the content of path selection processing by the path control unit 170 in the form of a table. The path selection logic table 80 includes item number, priority path, path status, I/O execution count, inter-controller module communication execution count, used path, and processing content columns.

A number indicating one item of selection logic is entered in the "item number" column. Identification information indicating the currently selected path (referred to as the "priority path") is entered in the "priority path" column. The state of the priority path is entered in the "path status" column. The state of the priority path is given as "normal" or "abnormal". A condition relating to the I/O execution count for the external storage access port belonging to the priority path is entered in the "I/O execution count" column. For selection logic that does not use a condition, a hyphen symbol "-" is given in the "I/O execution count" column. A condition relating to a communication execution count for the inter-controller module communication port belonging to the priority path is given in the "inter-controller module communication execution count" column. Here also, for selection logic that does not use a condition, a hyphen symbol "-" is given in the column of the "inter-controller module communication execution count" column. Identification information of the path selected by the selection logic in question is entered in the "used path" column. When no path is selected by the selection logic in question, a hyphen symbol "-" is entered in the "used path" column. The processing content for a case where a used path is not selected (that is, when the entry in the "used path" column is "-") is entered in the "processing content" column. When the used path is selected and there is no processing content, a hyphen symbol "-" is entered in the "processing content" column.

Here, the rows with the item numbers 1, 2, and 3 are selection logic for the case where the priority path is Path#1. The rows with the item numbers 4, 5, 6, and 7 are selection logic for the case where the priority path is Path#2. The rows numbered 8 and 9 are selection logic for the case where the priority path is Path#3. The lines numbered 10 and 11 are selection logic for the case where the priority path is Path#4.

The row for item number 1 indicates that when the status of Path#1 is normal and the I/O execution count of the external storage access port 117 is below the upper limit, the used path is set at Path#1.

The row for item number 2 indicates that when the state of Path#1 is normal but the I/O execution count of the external storage access port 117 is equal to or above the upper limit, the priority path is changed to Path#2.

The row for item number 3 indicates that when the state of Path#1 is abnormal, the priority path is changed to Path#2.

When the priority path has changed to Path#2, the path control unit 170 executes the selection logic of any of item numbers 4, 5, 6, and 7.

The row of item number 4 indicates that when the state of Path#2 is normal and the I/O execution count of the external storage access port 117a is below the upper limit, the used path is set at Path#2.

The row of item number 5 indicates that when the state of Path#2 is normal and the I/O execution count of the external storage access port 117a is equal to or above the upper limit, the current I/O operation is queued in the I/O issuing queue.

The row for item number 6 indicates that when the state of Path#2 is abnormal and the inter-controller module communication execution count of the inter-controller module communication port 119 is below the upper limit, the priority path is changed to Path#3.

The row for item number 7 indicates that when the state of Path#2 is abnormal and the inter-controller module communication execution count of the inter-controller module communication port 119 is equal to or above the upper limit, the current I/O operation is queued in the inter-controller module communication queue.

When the priority path has changed to Path#3, the path control unit 170 executes the selection logic of either of item numbers 8 and 9.

The row for item number 8 indicates that when the state of Path#3 is normal, the used path is set at Path#3.

The row for item number 9 indicates that when the state of Path#3 is abnormal, the priority path is changed to Path#4.

When the priority path has changed to Path#4, the path control unit 170 executes the selection logic of either of item numbers 10 and 11.

The row for item number 10 indicates that when the state of Path#4 is normal, the used path is set at Path#4.

The row for item number 11 indicates that when the state of Path#4 is abnormal, I/O abnormal termination is performed.

Next, a processing procedure when an external logical unit is accessed by the controller module 110 will be described.

FIG. 13 is a flowchart depicting an example of path selection. The processing depicted in FIG. 13 is described below in order of the step numbers. Although the procedure described below is executed when the controller module 110 has received an access request from the server 300 with the external logical unit LU#0 as the access destination, the procedure is the same when an access request with another external logical unit as the access destination is received.

(S11) The path control unit 170 refers to the external logical unit path information 151 and determines whether there is a "this apparatus (straight)-external storage (straight)" path. When there is a "this apparatus (straight)-external storage (straight)" path, the path control unit 170 advances the processing to step S12. When there is no "this apparatus (straight)-external storage (straight)" path, the path control unit 170 advances the processing to step S16.

(S12) The path control unit 170 selects one "this apparatus (straight)-external storage (straight)" path, refers to the abnormal path information in the external logical unit path information 151, and determines whether the selected path is normal. When the selected path is normal, the path control unit 170 advances the processing to step S15. When the selected path is not normal, the path control unit 170 advances the processing to step S13.

(S13) The path control unit 170 refers to the external logical unit path information 151 and determines whether there is another "this apparatus (straight)-external storage (straight)" path. When there is another "this apparatus (straight)-external storage (straight)" path, the path control unit 170 advances the processing to step S14. When there is no other "this apparatus (straight)-external storage (straight)" path, the path control unit 170 advances the processing to step S16.

(S14) The path control unit 170 selects another "this apparatus (straight)-external storage (straight)" path, refers to the abnormal path information in the external logical unit path information 151, and determines whether the selected path is normal. When the selected path is normal, the path control unit 170 advances the processing to step S15. When the selected path is not normal, the path control unit 170 advances the processing to step S13.

(S15) The path control unit 170 refers to the I/O execution count for the selected path in the I/O management table 152 and determines whether the I/O execution count for the selected path has reached the I/O issuing upper limit. When the I/O execution count has reached the I/O issuing upper limit, the path control unit 170 advances the processing to step S13. When the I/O execution count has not reached the I/O issuing upper limit, the path control unit 170 confirms the current selected path as the used path and ends the path selection processing.

(S16) The path control unit 170 refers to the external logical unit path information 151 and determines whether there is a "this apparatus (straight)-external storage (cross)" path. When there is a "this apparatus (straight)-external storage (cross)" path, the path control unit 170 advances the processing to step S17. When there is no "this apparatus (straight)-external storage (cross)" path, the path control unit 170 advances the processing to step S21.

(S17) The path control unit 170 selects one "this apparatus (straight)-external storage (cross)" path, refers to the abnormal path information in the external logical unit path information 151, and determines whether the selected path is normal. When the selected path is normal, the path control unit 170 advances the processing to step S20. When the selected path is not normal, the path control unit 170 advances the processing to step S18.

(S18) The path control unit 170 refers to the external logical unit path information 151 and determines whether there is another "this apparatus (straight)-external storage (cross)" path. When there is another "this apparatus (straight)-external storage (cross)" path, the path control unit 170 advances the processing to step S19. When there is no other "this apparatus (straight)-external storage (straight)" path, the path control unit 170 advances the processing to step S21.

(S19) The path control unit 170 selects another "this apparatus (straight)-external storage (cross)" path, refers to the abnormal path information in the external logical unit path information 151, and determines whether the selected path is normal. When the selected path is normal, the path control unit 170 advances the processing to step S20. When the selected path is not normal, the path control unit 170 advances the processing to step S18.

(S20) The path control unit 170 refers to the I/O execution count for the selected path in the I/O management table 152 and determines whether the I/O execution count for the selected path has reached the I/O issuing upper limit. When the I/O execution count has reached the I/O issuing upper limit, the path control unit 170 advances the processing to step S18. When the I/O execution count has not reached the I/O issuing upper limit, the path control unit 170 confirms the current selected path as the used path and ends the path selection processing.

(S21) The path control unit 170 refers to the abnormal path information in the external logical unit path information 151 and determines, out of the "this apparatus (straight)-external storage (straight)" paths and the "this apparatus (straight)-external storage (cross)" paths, whether there is a normal path for which it is possible to issue an I/O command. When there is a normal path out of the "this apparatus (straight)-external storage (straight)" paths and the "this apparatus (straight)-external storage (cross)" paths, the path control unit 170 advances the processing to step S22. When there is no normal path out of the "this apparatus (straight)-external storage (straight)" paths and the "this apparatus (straight)-external storage (cross)" paths, the path control unit 170 advances the processing to step S23.

(S22) The path control unit 170 enqueues an I/O command for the external logical unit in an I/O issuing queue for the same controller module (the controller module 110). The path control unit 170 then ends the path selection processing.

(S23) The path control unit 170 selects a path via the other controller module (the controller module 120). The details of how a path via the other controller module is selected will be described later.

Here, the I/O issuing upper limit used in the determinations in steps S15 and S20 is set in advance in accordance with the upper limit of the memory resources allocated to the external storage access port belonging to the selected path.

When the used path has been confirmed, the path control unit 170 instructs the I/O processing unit 180 to transmit an I/O command using the used path. The I/O processing unit 180 transmits an I/O command for the external logical unit that is the access destination to the external storage apparatus 200 via the designated used path.

By performing the procedure described above, the controller module 110 normally uses the highest priority path out of the available paths. When the number of pending I/O commands out of the I/O commands that have already been transmitted via the path in question has reached a threshold (the "I/O issuing upper limit"), the controller module 110 switches the port to be used to transmit the next I/O command to the external storage apparatus 200. On the other hand, when the number has not reached the threshold, the controller module 110 does not switch the port to be used.

Figure 14:
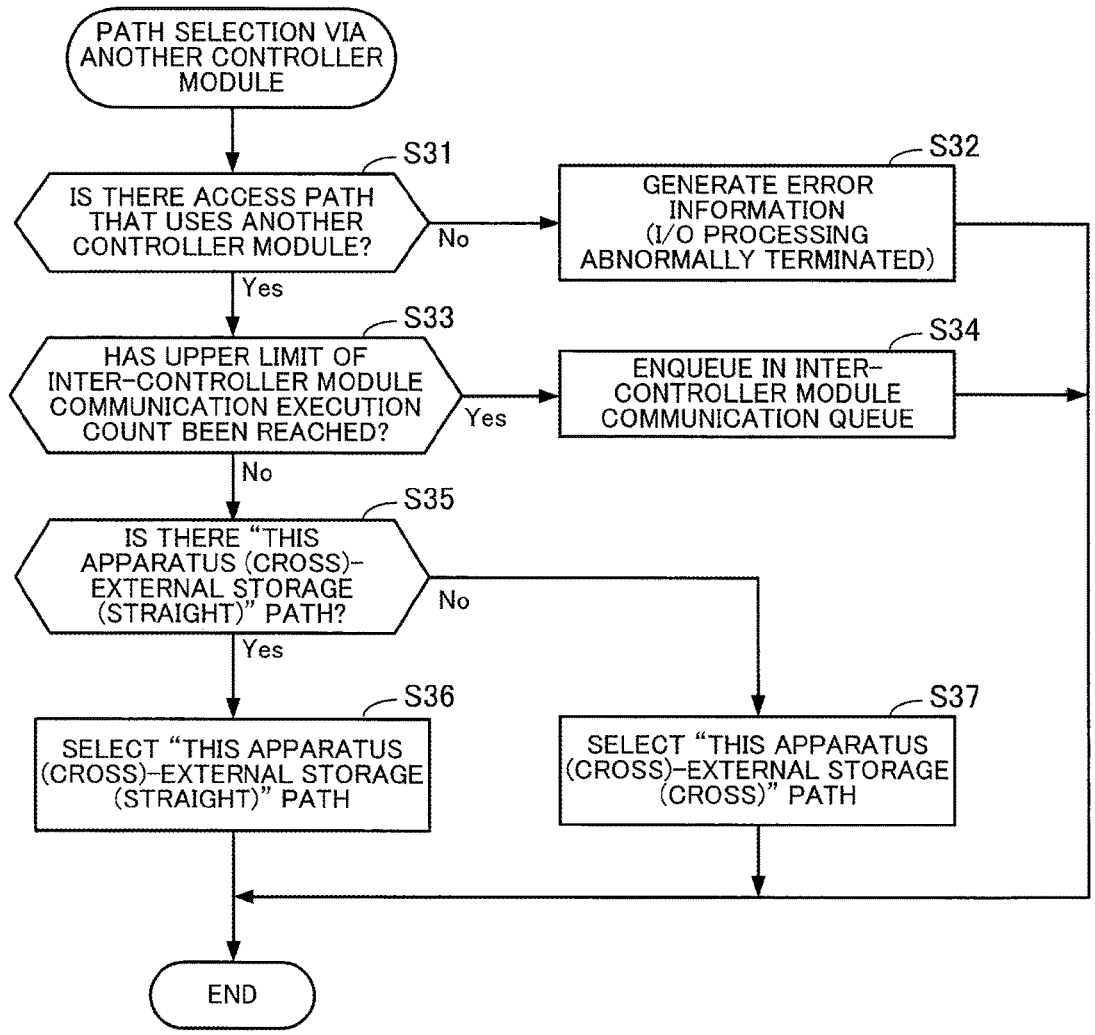
FIG. 14 is a flowchart depicting an example of selection of a path via another controller module.

FIG. 14 is a flowchart depicting an example of selection of a path via another controller module. The process depicted in FIG. 14 is described below in order of the step numbers. Note that the procedure described below corresponds to step S23 in FIG. 13.

(S31) The path control unit 170 refers to the external logical unit path information 151 and determines whether there is an access path that uses another controller module to reach the external logical unit that is the access destination. When there is an access path that uses another controller module to reach the external logical unit, the path control unit 170 advances the processing to step S33. When there is no access path that uses another controller module to reach the external logical unit, the path control unit 170 advances the processing to step S32. Here, the access path that uses another controller module is a "this apparatus (cross)-external storage (straight)" path or a "this apparatus (cross)-external storage (cross)" path.

(S32) The path control unit 170 generates error information and abnormally terminates the I/O processing. The path control unit 170 then ends the selection of a path via another controller module.

(S33) The path control unit 170 refers to the I/O management table 152 and determines whether the inter-controller module communication execution count has reached the upper limit. When the inter-controller module communication execution count has reached the upper limit, the path control unit 170 advances the processing to step S34. When the inter-controller module communication execution count has not reached the upper limit, the path control unit 170 advances the processing to step S35.

(S34) The path control unit 170 enqueues an I/O command for the external logical unit in the inter-controller module communication queue of the same controller module (that is, the controller module 110). The path control unit 170 then ends the selection of a path via another controller module.

(S35) The path control unit 170 refers to the external logical unit path information and determines whether there is a "this apparatus (cross)-external storage (straight)" path. When there is a "this apparatus (cross)-external storage (straight)" path, the path control unit 170 advances the processing to step S36. When there is no "this apparatus (cross)-external storage (straight)" path, the path control unit 170 advances the processing to step S37.

(S36) The path control unit 170 selects a "this apparatus (cross)-external storage (straight)" path as the used path. The path control unit 170 then ends the selection of the path via another controller module.

(S37) The path control unit 170 selects a "this apparatus (cross)-external storage (cross)" path as the used path. The path control unit 170 then ends the selection of a path via another controller module. When there is no "this apparatus (cross)-external storage (cross)" path in step S37 however, the path control unit 170 abnormally ends the I/O processing.

According to the above procedure, the controller module 110 preferentially uses the recommended path (used path) selected for the external logical unit that is the access destination, and at timing where the number of I/O commands issued for the recommended path has reached the upper limit, is capable of accessing the external logical unit by switching paths to a path with a lower priority than the recommended path.

Next, the procedure for dequeue processing of an I/O command that was enqueued in the I/O issuing queue in step S22 of FIG. 13 will be described.

Figure 15:
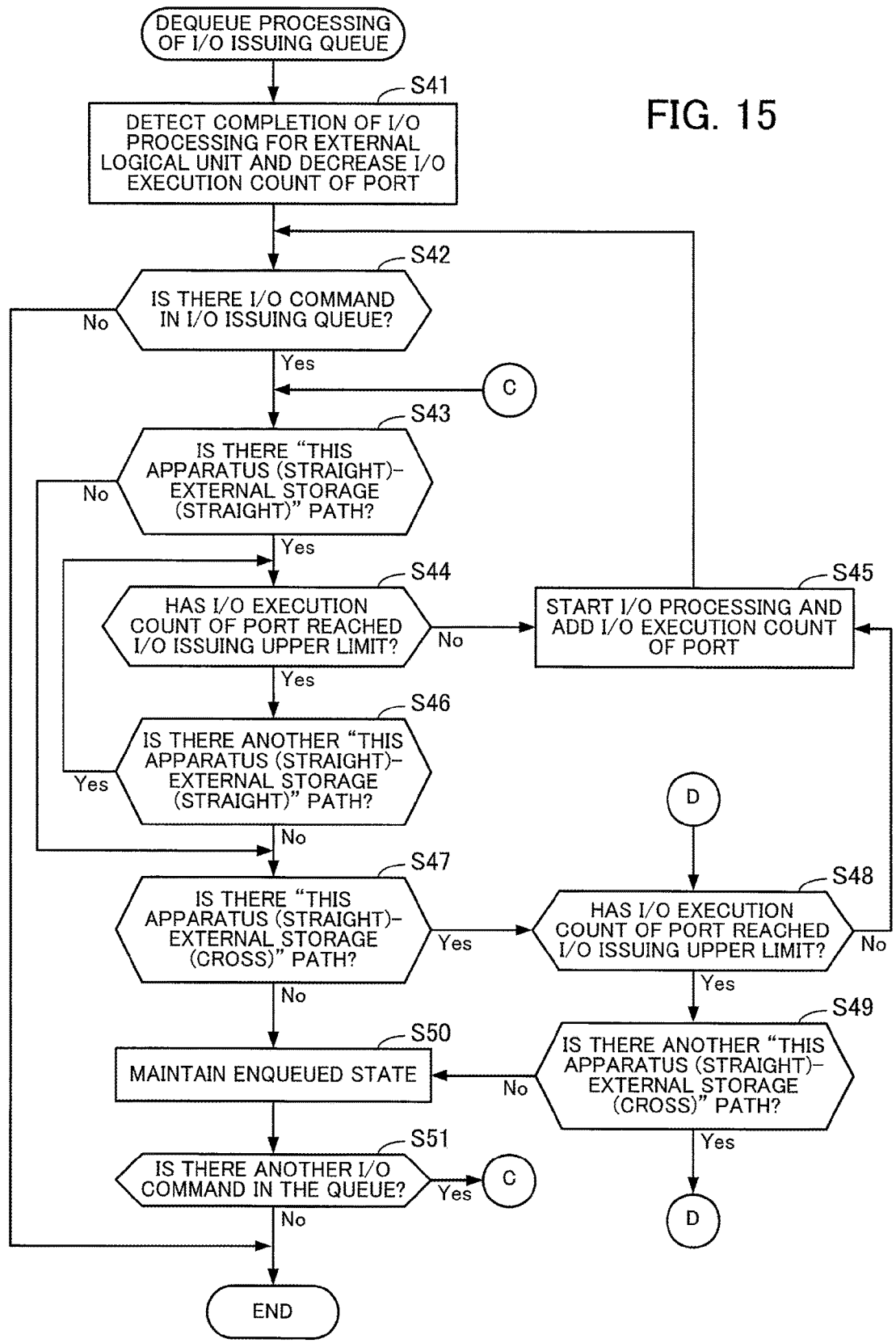
FIG. 15 is a flowchart depicting an example of dequeue processing of an I/O issuing queue.

FIG. 15 is a flowchart depicting an example of dequeue processing of the I/O issuing queue. The processing depicted in FIG. 15 is described below in order of the step numbers.

(S41) The path control unit 170 detects completion of I/O processing for an external logical unit by the I/O processing unit 180, and subtracts a predetermined number from the I/O execution count (that is, the count of I/O executions recorded in the I/O management table 152) for the external storage access port for which the I/O processing has been completed. The path control unit 170 may subtract the detected number of completed I/O processes (that is, a number that is 1 or higher) detected at this time.

(S42) The path control unit 170 determines whether an I/O command is present in the I/O issuing queue. When there is an I/O command in the I/O issuing queue, the path control unit 170 advances the processing to step S43. When there is no I/O command in the I/O issuing queue, the path control unit 170 ends the dequeue processing for the I/O issuing queue.

(S43) The path control unit 170 refers to the external logical unit path information corresponding to the external logical unit that is the access destination of the I/O command and determines whether there is a "this apparatus (straight)-external storage (straight)" path. When there is a "this apparatus (straight)-external storage (straight)" path, the path control unit 170 advances the processing to step S44. When there is no "this apparatus (straight)-external storage (straight)" path, the path control unit 170 advances the processing to step S47.

(S44) The path control unit 170 refers to the external logical unit path information corresponding to the external logical unit that is the access destination and selects a normal path out of the "this apparatus (straight)-external storage (straight)" paths. The path control unit 170 refers to the I/O management table 152 to determine whether the I/O execution count of the external storage access port belonging to the path in question has reached the I/O issuing upper limit. When the I/O execution count has reached the I/O issuing upper limit, the path control unit 170 advances the processing to step S46. When the I/O execution count has not reached the I/O issuing upper limit, the path control unit 170 advances the processing to step S45.

(S45) The path control unit 170 starts the I/O processing by the I/O processing unit 180, and adds a predetermined number to the I/O execution count of the external storage access port corresponding to the selected path (that is, the I/O execution count recorded in the I/O management table 152). As one example, the path control unit 170 adds the number of I/O commands (a number that is 1 or higher) to be transmitted at this time by the I/O processing unit 180. The path control unit 170 also deletes the I/O commands transmitted at this time by the I/O processing unit 180 from the I/O issuing queue. The path control unit 170 then advances the processing to step S42.

(S46) The path control unit 170 refers to the external logical unit path information corresponding to the external logical unit that is the access destination of the I/O command and determines whether there is another "this apparatus (straight)-external storage (straight)" path. When there is another "this apparatus (straight)-external storage (straight)" path, the path control unit 170 advances the processing to step S44. When there is no other "this apparatus (straight)-external storage (straight)" path, the path control unit 170 advances the processing to step S47.

(S47) The path control unit 170 refers to the external logical unit path information corresponding to the external logical unit that is the access destination of the I/O command, and determines whether there is a "this apparatus (straight)-external storage (cross)" path. When there is a "this apparatus (straight)-external storage (cross)" path, the path control unit 170 advances the processing to step S48. When there is no "this apparatus (straight)-external storage (cross)" path, the path control unit 170 advances the processing to step S50.

(S48) The path control unit 170 refers to the external logical unit path information corresponding to the external logical unit that is the access destination and selects one normal path out of the "this apparatus (straight)-external storage (cross)" paths. The path control unit 170 refers to the I/O management table 152 to determine whether the I/O execution count of the external storage access port belonging to the path in question has reached the I/O issuing upper limit. When the I/O execution count has reached the I/O issuing upper limit, the path control unit 170 advances the processing to step S49. When the I/O execution count has not reached the I/O issuing upper limit, the path control unit 170 advances the processing to step S45.

(S49) The path control unit 170 refers to the external logical unit path information corresponding to the external logical unit that is the access destination of the I/O command, and determines whether there is another "this apparatus (straight)-external storage (cross)" path. When there is another "this apparatus (straight)-external storage (cross)" path, the path control unit 170 advances the processing to step S48. When there is no other "this apparatus (straight)-external storage (cross)" path, the path control unit 170 advances the processing to step S50.

(S50) The path control unit 170 keeps the I/O command being investigated in the enqueued state.

(S51) The path control unit 170 further determines whether further I/O commands are present in the I/O issuing queue. When there is an I/O command in the I/O issuing queue, the path control unit 170 advances the processing to step S43. When there is no I/O command in the I/O issuing queue, the path control unit 170 ends the dequeue processing of the I/O issuing queue.

By operating as described above, the path control unit 170 performs dequeue processing of the I/O commands queued in the I/O issuing queue when a response to an I/O is received from the external logical unit. At this time, for the command queued at the front of the I/O issuing queue, the path control unit 170 selects, out of the external storage access ports of the same controller module (that is, the controller module 110), a port where the I/O execution count has not reached the threshold.

Next, the procedure of dequeue processing of an I/O command that was enqueued in the inter-controller module communication queue in step S34 of FIG. 14 will be described.

Figure 16:
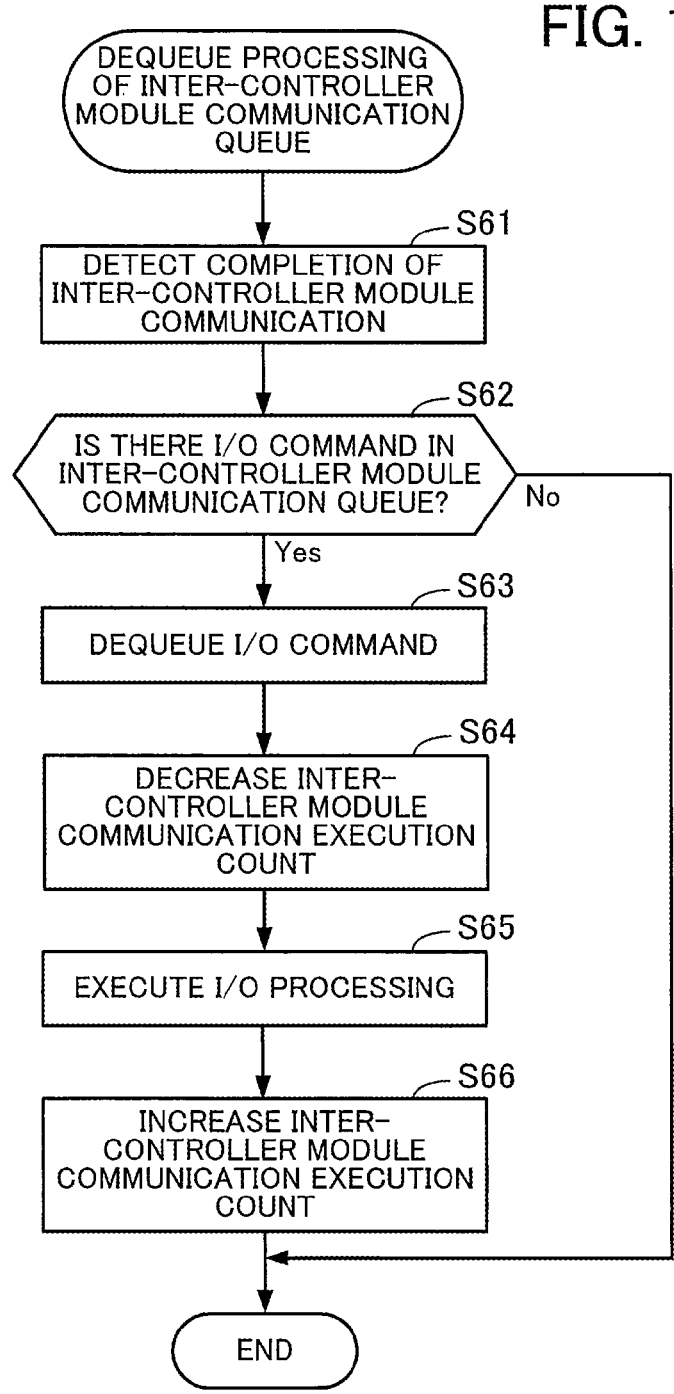
FIG. 16 is a flowchart depicting an example of dequeue processing of an inter-controller module communication queue.

FIG. 16 is a flowchart depicting an example of dequeue processing of the inter-controller module communication queue. The processing depicted in FIG. 16 is described below in order of the step numbers.

(S61) The path control unit 170 detects completion of inter-controller module communication by the I/O processing unit 180. As one example, one I/O command corresponds to one incidence of inter-controller module communication. On receiving an access result for an external logical unit from the controller module 120 in response to a given I/O command, the I/O processing unit 180 detects that inter-controller module communication corresponding to the I/O command in question is complete. The path control unit 170 may detect completion of one or more incidences of inter-controller module communication.

(S62) The path control unit 170 determines whether an I/O command is present in the inter-controller module communication queue. When there is an I/O command in the inter-controller module communication queue, the path control unit 170 advances the processing to step S63. When there is no I/O command in the inter-controller module communication queue, the path control unit 170 ends the dequeue processing for the inter-controller module communication queue.

(S63) The path control unit 170 dequeues the I/O command from the inter-controller module communication queue. The path control unit 170 dequeues one or more I/O commands in accordance with the number of incidences of inter-controller module communication for which completion was detected in step S61.

(S64) The path control unit 170 subtracts the number of incidences of inter-controller module communication for which completion was detected in step S61 from the inter-controller module communication execution count recorded in the I/O management table 152.

(S65) The path control unit 170 starts the I/O processing by the I/O processing unit 180. The I/O processing unit 180 transmits an I/O command to the controller module 120 to request I/O processing for an external logical unit according to the I/O command. As one example, when a request for I/O processing is received, the controller module 120 functions as an initiator and executes I/O processing for an external logical unit.

(S66) The path control unit 170 increases the inter-controller module communication execution count recorded in the I/O management table 152. Here, the path control unit 170 adds the number of I/O commands dequeued in step S63 to the inter-controller module communication execution count. The path control unit 170 then ends the dequeue processing for the inter-controller module communication queue.

In this way, the controller module 110 uses different queues to queue I/O commands between when there is a path via an external storage access port of the controller module 110 to the external logical unit and when there is no path via an external storage access port of the controller module 110 to the external logical unit. By doing so, when an external storage access port in the controller module 110 is available, it is possible to reduce the overheads caused by inter-controller module communication. Also, when the controller module 110 is incapable of using an external storage access port, the controller module 110 appropriately requests the controller module 120 to perform I/O processing.

Even when a recommended path for transmitting an I/O command has been selected by the controller module 110, a delay on the transmission path or the like may occur on the recommended path. In this situation, it is not necessarily appropriate to use the recommended path. Selecting another path may result in a reduction in the response time from the external storage apparatus 200 to an I/O command.

For this reason, the controller module 110 may use the function described below to dynamically correct the recommended path.

Figure 17:
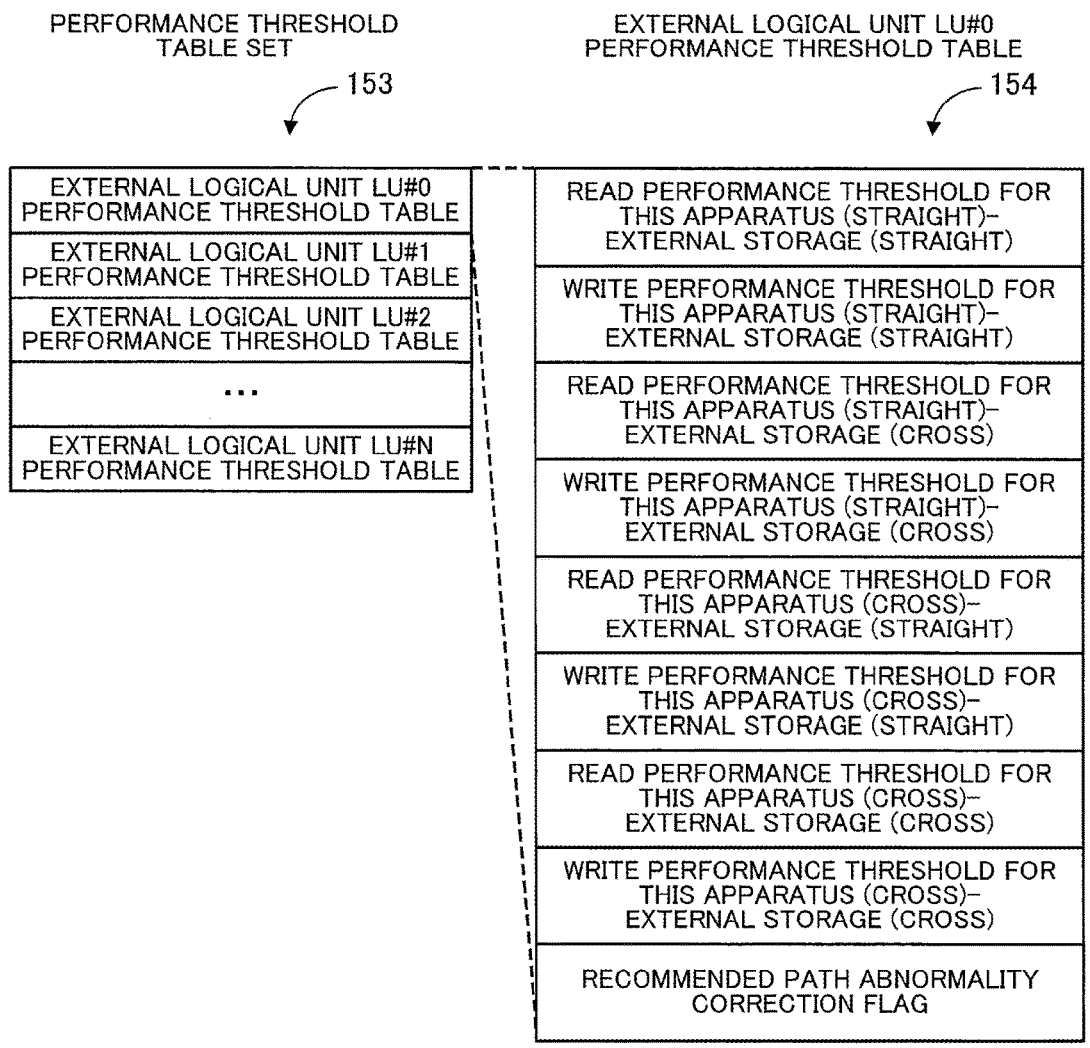
FIG. 17 depicts an example of a performance threshold table.

FIG. 17 depicts an example of a performance threshold table. A performance threshold table set 153 and an external logical unit LU#0 performance threshold table 154 are stored in the storage unit 150. The performance threshold table set 153 is a set which includes a performance threshold table for each external logical unit. The external logical unit LU#0 performance threshold table 154 is one element in the performance threshold table set 153.

As one example, the performance threshold table set 153 includes an external logical unit LU#0 performance threshold table 154, an external logical unit LU#1 performance threshold table, . . . . Although the following description mainly focuses on the external logical unit LU#0 performance threshold table 154, similar information is also set in performance threshold tables, such as the external logical unit LU#1 performance threshold table, . . . .

The external logical unit LU#0 performance threshold table 154 is a table in which performance thresholds are set for each path, along with a recommended path abnormality correction flag. As one example, a performance threshold is an upper limit for the permitted response time to an I/O command. Performance thresholds are respectively set for a read and a write. The performance threshold for a read is referred to as the "read performance threshold", and the performance threshold for a write is referred to as the "write performance threshold". The recommended path abnormality correction flag is a flag indicating whether the recommended path is presently being corrected. When the recommended path abnormality correction flag is "on", this indicates that correction is being performed. Conversely, when the recommended path abnormality correction flag is "off", this indicates that correction is not being performed. The default value of the recommended path abnormality correction flag is "off".

As one example, in the external logical unit LU#0 performance threshold table 154, a read performance threshold and a write performance threshold are set for the "this apparatus (straight)-external storage (straight)" paths to the external logical unit LU#0. In the external logical unit LU#0 performance threshold table 154, a read performance threshold and a write performance threshold are also set for the "this apparatus (straight)-external storage (cross)" paths to the external logical unit LU#0. Similarly, in the external logical unit LU#0 performance threshold table 154, a read performance threshold and a write performance threshold are set for the "this apparatus (cross)-external storage (straight)" paths to the external logical unit LU#0. Likewise, in the external logical unit LU#0 performance threshold table 154, a read performance threshold and a write performance threshold are set for the "this apparatus (cross)-external storage (cross)" paths to the external logical unit LU#0. In the external logical unit LU#0 performance threshold table 154, the recommended path abnormality correction flag indicating whether the recommended path is being corrected is also set for the paths to the external logical unit LU#0.

The path control unit 170 selects the path to be used to transmit an I/O command based on the individual performance threshold tables corresponding to the external logical units included in the performance threshold table set 153. The selection procedure is described below.

Figure 18:
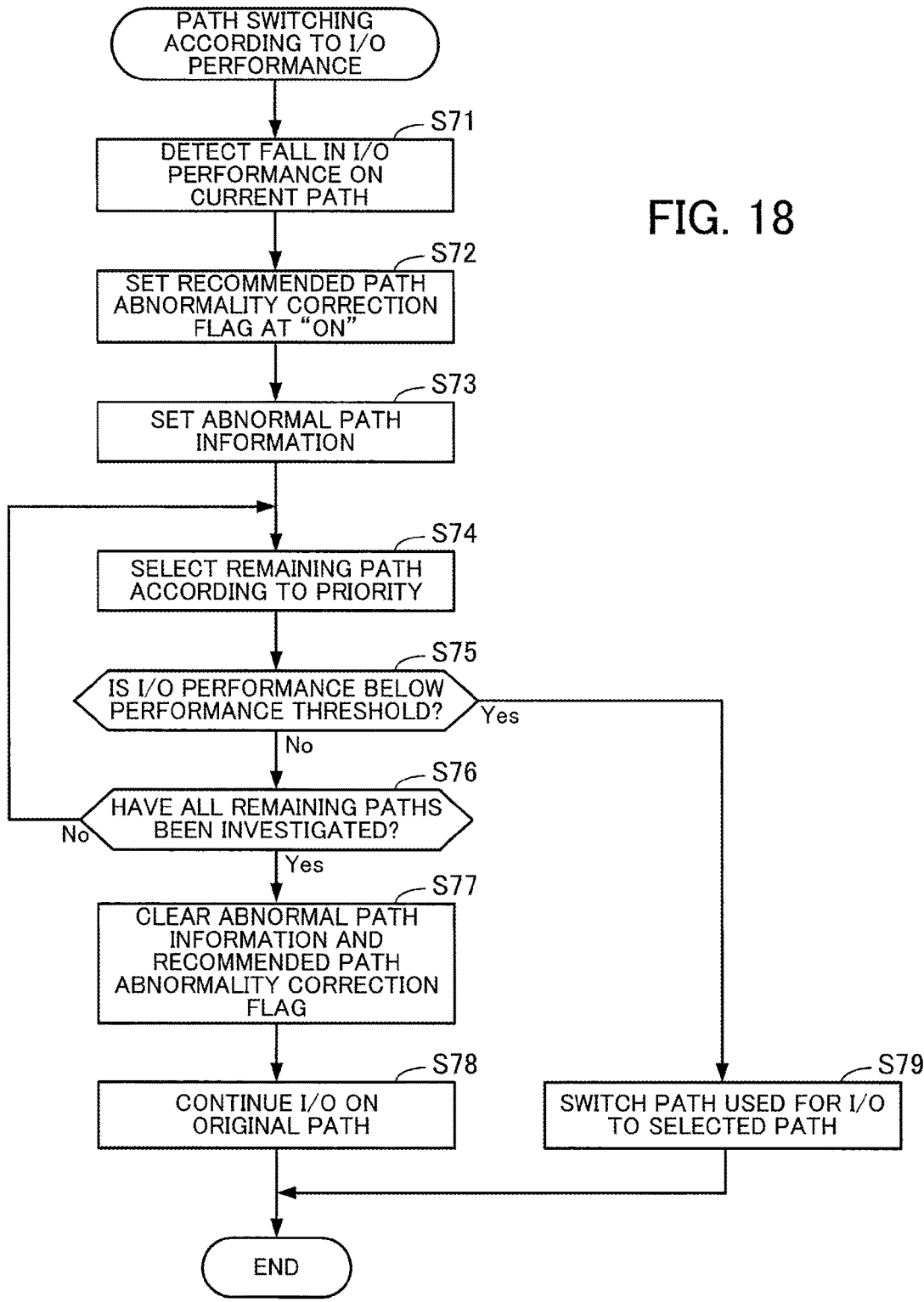
FIG. 18 is a flowchart depicting an example of path switching according to I/O performance.

FIG. 18 is a flowchart depicting an example of path switching according to I/O performance. The processing depicted in FIG. 18 is described below in order of the step numbers. The following describes I/O processing for the external logical unit LU#0, but the same procedure is used for other external logical units.

(S71) The path control unit 170 detects a fall in I/O performance on the recommended path currently being used (or "current path") to the external logical unit LU#0. As one example, the path control unit 170 measures the time (response time) from the transmission of an I/O command to the external logical unit LU#0 until the response, separately for reads and writes. When at least one of the response time to a read I/O command exceeds the read performance threshold and the response time to a write I/O command exceeds the write performance threshold, the path control unit 170 detects that the I/O performance of the current path has fallen. As one example, when the current path is Path#1, the path control unit 170 uses the read performance threshold and the write performance threshold for "this apparatus (straight)-external storage (straight)" paths in the external logical unit LU#0 performance threshold table 154 to detect a fall in the I/O performance.

(S72) The path control unit 170 sets the recommended path abnormality correction flag in the external logical unit LU#0 performance threshold table 154 at "on".

(S73) The path control unit 170 sets abnormal path information indicating the current path in the external logical unit path information 151. As one example, when the current path is Path#1, the path control unit 170 sets information indicating Path#1 as the abnormal path information in the external logical unit path information 151. As a result, the path control unit 170 excludes path#1 during path selection.

(S74) The path control unit 170 selects one remaining path (that is, a path that is normal and has not been selected) according to the priorities. As one example, when arranged in descending order of priority, the paths are given as "this apparatus (straight)-external storage (straight)", "this apparatus (straight)-external storage (cross)", "this apparatus (cross)-external storage (straight)", and "this apparatus (cross)-external storage (cross)".

(S75) The path control unit 170 determines whether the I/O performance for reads and writes on the selected path is below the performance thresholds for reads and writes set in the external logical unit LU#0 performance threshold table 154. When the I/O performance for both reads and writes are below the performance threshold, the path control unit 170 advances the processing to step S79. When the I/O performance of at least one of reads and writes is equal to or above the performance threshold, the path control unit 170 advances the processing to step S76.

(S76) The path control unit 170 determines whether all of the remaining paths (that is, paths aside from the current path) have been investigated. When all of the remaining paths have been investigated, the path control unit 170 advances the processing to step S77. When there is a remaining path that has not been investigated, the path control unit 170 advances the processing to step S74.

(S77) The path control unit 170 clears the abnormal path information in the external logical unit path information 151 set in step S73 and the recommended path abnormality correction flag in the external logical unit LU#0 performance threshold table 154. As a result, the path information set in step S73 is deleted from the abnormal path information in the external logical unit path information 151. The recommended path abnormality correction flag in the external logical unit LU#0 performance threshold table 154 is also set at "off".

(S78) The path control unit 170 continues performing I/O operations on the original path (that is, the current path). The path control unit 170 ends the path switching according to I/O performance.

(S79) The path control unit 170 switches the path used for I/O operations from the current path to the path selected in step S74. The path control unit 170 then ends the path switching according to I/O performance.

In this way, when the I/O performance of the recommended path does not satisfy a performance threshold, the controller module 110 switches to another path whose I/O performance satisfies the performance threshold so that access to the external storage apparatus 200 is performed at high speed. However, when the I/O performance observed for each path at the controller module 110 exceeds the performance threshold, the current path continues to be used so as to prevent accesses from being interrupted.

As one example, according to the procedure in FIG. 13, even when the path with the highest priority is being used and the I/O execution count of the path has not reached the threshold (the I/O issuing upper limit), the controller module 110 will still switch the port used to transmit I/O commands when the response time of communication to the external storage apparatus 200 via the path in question has reached the performance threshold.

As described earlier, the controller module 110 realizes faster access through the use of a path with the highest possible priority. For this reason, after changing the path to be used according to the procedure in FIG. 18, the controller module 110 performs path restoration control as described below.

Figure 19:
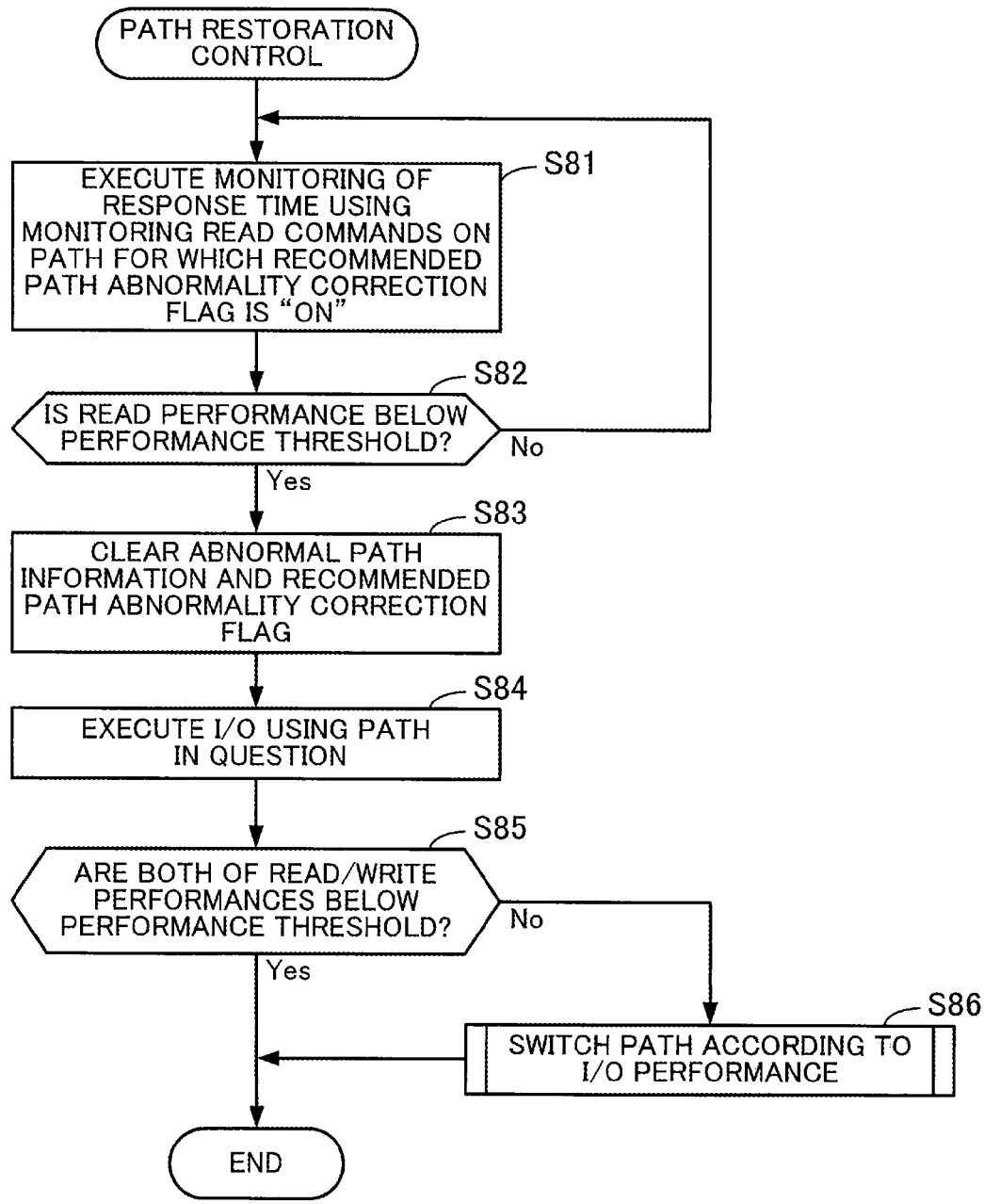
FIG. 19 is a flowchart depicting an example of path restoration control.

FIG. 19 is a flowchart depicting an example of path restoration control. The processing depicted in FIG. 19 is described below in order of the step numbers.

(S81) The path control unit 170 monitors the response time for the external logical unit in question by way of a monitoring read command for a path (or "monitored path") where the recommended path abnormality correction flag is set at "on". A monitoring read command is a command for monitoring purposes (or "monitoring command") that performs a read at the target external logical unit. The path control unit 170 periodically monitors each monitored path using monitoring read commands.

(S82) The path control unit 170 refers to the external logical unit LU#0 performance threshold table 154 and determines whether the read performance (response time) for the external logical unit LU#0 via the monitored path is below the performance threshold. When the read performance is below the performance threshold, the path control unit 170 advances the processing to step S83. When the read performance is equal to or higher than the performance threshold, the path control unit 170 advances the processing to step S81.

(S83) The path control unit 170 clears the abnormal path information in the external logical unit path information 151 set in step S73 and the recommended path abnormality correction flag in the external logical unit LU#0 performance threshold table 154. As a result, the information on the path set in step S73 is deleted from the abnormal path information in the external logical unit path information 151. The recommended path abnormality correction flag in the external logical unit LU#0 performance threshold table 154 is also set at "off".

(S84) The path control unit 170 switches the path to be used for the external logical unit LU#0 to the monitored path. The path control unit 170 starts I/O processing by the I/O processing unit 180 and has an I/O command transmitted (that is, has I/O executed) to the external logical unit LU#0 using the path in question (that is, the path that was the monitored path).

(S85) The path control unit 170 refers to the external logical unit LU#0 performance threshold table 154 and determines whether the read/write performances (that is, both read performance and write performance) are below the performance threshold. When both the read performance and the write performance are below the performance threshold, the path control unit 170 ends the path restoration control. When at least one of the read performance and the write performance is not below the performance threshold, the path control unit 170 advances the processing to step S86.

(S86) The path control unit 170 executes a path switching process (see FIG. 18) in accordance with the I/O performance. The path control unit 170 then ends the path restoration control.

As described above, when the port to be used has been switched based on the result of comparing the response time and the performance threshold, the controller module 110 transmits monitoring commands to the external storage apparatus 200 via the port used before switching and monitors the response time. When the response time falls below the performance threshold, the controller module 110 restores the port used to transmit I/O commands to the external storage apparatus 200 to the port used before switching. By doing so, the controller module 110 speeds up the access to the external storage apparatus 200 by using a path with a comparatively small overhead for accessing external logical units.

Here, for a configuration like the storage system according to the second embodiment where a plurality of paths are provided from the storage apparatus 100 to the external storage apparatus 200, it is conceivable to switch between the paths to distribute accesses between the plurality of paths. However, the storage apparatus 100 is not capable of monitoring the operation states of physical elements (the controller modules 210 and 220, the host ports 215, 215a, 225, and 225a, the HDDs, and the like) provided in the external storage apparatus 200. This means that it is difficult for the storage apparatus 100 to observe changes in the operation states at the external storage apparatus 200 and determine the timing for switching paths.

For this reason, based on the processing status of inputs/outputs via a first path currently being used, the storage apparatus 100 switches the port to be used to transmit the next command to a port belonging to a second path that differs to the first path. As one example, the storage apparatus 100 may detect, from the number of pending I/O commands that are yet to receive a response for the external storage access port belonging to the first path, the risk (signs) of delays occurring in the input/output processing of data into and from the external storage apparatus 200 for some reason. The storage apparatus 100 switches the used port in accordance with detection of these signs. By doing so, the storage apparatus 100 becomes capable of switching the port (or path) to be used to transmit a command at appropriate timing, even when the storage apparatus 100 is not capable of directly grasping operation states at the external storage apparatus 200. In particular, it is possible to distribute input/output processing to another path (that is, to another external storage access port or another inter-controller module communication port) before a delay occurs in data input/output processes for the external storage apparatus 200. In this way, by determining that I/O processing using the path currently in use has been stagnated for some reason and switching to another path, it is possible to optimize the path.

Also, as the number of pending commands (or "I/O execution count") increases, the amount of memory resources (that is, resources of the RAM 112) used for each port also increases. On the other hand, there is an upper limit on the memory resources allocated to each port. This means by switching the path to the external storage apparatus 200 as described above, it is possible to make distributed use of the memory resources corresponding to the respective ports of the storage apparatus 100. In addition, by preferentially using a path with a low overhead for communication between controller modules (that is, a path with high priority), it is possible to ensure a certain I/O performance for the external storage apparatus 200 and for the controller module 110 to appropriately control the access flow to the external storage apparatus 200. By doing so, efficient use is made of the resources of the controller module 110.

Note that the information processing according to the first embodiment is realized by having the processing unit 11b execute a program. The information processing in the second embodiment is also realized by having the processor 111 execute a program. The program may be recorded on the computer-readable recording medium 70.

As one example, the program is distributed through distribution of the recording medium 70 on which the program has been recorded. As examples, a Flexible Disk (FD), an optical disc such as a Compact Disc (CD), a Digital Versatile Disc (DVD), or a Blu-ray (registered trademark), and a Magneto-Optical disk (MO) is used as the recording medium 70. Alternatively, the program may be stored in another computer and distributed via a network. A computer may store (or "install") a program recorded on the recording medium 70 or a program received from another computer in a storage device, such as the RAM 112 or the flash memory 113, and thereafter execute the program by reading it out from the storage device.

According to the present embodiments, it is possible to switch between communication paths at appropriate timing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
   a first storage apparatus including a first storage control apparatus which has a first port used to transmit a command instructing an input or output of data and transmits the command in response to an access request received from an information processing device, and a second storage control apparatus which has a second port used to transmit the command; and
   a second storage apparatus that includes a plurality of third ports that form a plurality of communication paths with the first port and the second port, receives the command via one of the third ports, and executes the input or output of data based on the command,
   wherein based on a processing state of inputs and outputs via a first communication path currently being used to transmit the command to the second storage apparatus, the first storage control apparatus switches a port to be used to transmit a next command to the second storage apparatus to a port belonging to a second communication path out of the plurality of communication paths.

2. The storage system according to claim 1, wherein when a number of commands that are yet to receive a response, out of the commands that have been transmitted via the first communication path, has reached a first threshold, the first storage control apparatus performs switching of the port to be used to transmit the next command to the second storage apparatus.

3. The storage system according to claim 2, wherein even when the number has not reached the first threshold, the first storage control apparatus performs the switching when a response time of communication to the second storage apparatus via the first communication path has reached a second threshold.

4. The storage system according to claim 3, wherein when switching has been performed based on a comparison result for the response time and the second threshold, the first storage control apparatus transmits a monitoring command via the first communication path to the second storage apparatus, monitors the response time, and restores the port to be used to transmit the command to the second storage apparatus to a port belonging to the first communication path when the response time falls below the second threshold.

5. The storage system according to claim 1, wherein the first storage control apparatus acquires recommended path information, which indicates, out of the plurality of communication paths, a communication path recommended for accessing a logical unit of the second storage apparatus, for each logical unit from the second storage apparatus and decides, based on the recommended path information, a priority for each of the plurality of communication paths for each logical unit to select a switched-to port.

6. The storage system according to claim 5, wherein the first storage control apparatus sets a priority of a communication path via the first port, out of the plurality of communication paths, higher than a priority of a communication path via the second port.

7. The storage system according to claim 5, wherein:
the second storage apparatus includes a third storage control apparatus and a fourth storage control apparatus that executes the input or output of data for the logical units, and
the first storage control apparatus the decides a first priority of the first communication path and a second priority of the second communication path in such a manner that the first priority is higher than the second priority when a number of storage control apparatuses on the first communication path from the first storage control apparatus to the fourth storage control apparatus is less than a number of storage control apparatuses on the second communication path from the first storage control apparatus to the fourth storage control apparatus.

8. A storage control apparatus that belongs to a first storage apparatus, the storage control apparatus comprising:
a first port used to transmit a command instructing an input or output of data at a second storage apparatus that differs to the first storage apparatus, the second storage apparatus including a plurality of ports that form a plurality of communication paths with the first port and a second port and receiving the command via one of the plurality of ports, the second port belonging to another storage control apparatus which belongs to the first storage apparatus; and
a processor that switches, based on a processing state of inputs and outputs via a first communication path currently being used to transmit the command to the second storage apparatus, a port to be used to transmit a next command to the second storage apparatus to a port belonging to a second communication path out of the plurality of communication paths.

9. A non-transitory computer-readable storage medium storing a computer program that causes a computer to execute a process comprising:
acquiring information indicating a plurality of communication paths between a first port, which is used to transmit a command instructing an input or output of data at a second storage apparatus that differs to a first storage apparatus to which the computer belongs, and a plurality of third ports that the second storage apparatus includes and between a second port that is included in another storage control apparatus belonging to the first storage apparatus and the plurality of third ports; and
switching a port to be used to transmit a next command to the second storage apparatus to a port belonging to a second communication path out of the plurality of communication paths, based on a processing state of inputs and outputs via a first communication path currently being used to transmit the command to the second storage apparatus.

* * * * *